US012587256B2

(12) United States Patent
Gaal et al.

(10) Patent No.: US 12,587,256 B2
(45) Date of Patent: Mar. 24, 2026

(54) SYNCHRONIZATION BEAM SWEEPING WITH CONTROLLABLE REFLECTIVE SURFACES IN PRESENCE OF MULTIPLE OPERATORS

(71) Applicant: QUALCOMM Incorporated, San Diego, CA (US)

(72) Inventors: Peter Gaal, San Diego, CA (US); Saeid Sahraei, San Diego, CA (US); Yu Zhang, San Diego, CA (US); Hung Dinh Ly, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 18/552,027

(22) PCT Filed: May 10, 2021

(86) PCT No.: PCT/CN2021/092647
§ 371 (c)(1),
(2) Date: Sep. 22, 2023

(87) PCT Pub. No.: WO2022/236538
PCT Pub. Date: Nov. 17, 2022

(65) Prior Publication Data
US 2024/0187078 A1 Jun. 6, 2024

(51) Int. Cl.
*H04B 7/10* (2017.01)
*H04B 7/04* (2017.01)
*H04B 7/06* (2006.01)
(52) U.S. Cl.
CPC ..... *H04B 7/06952* (2023.05); *H04B 7/04013* (2023.05)

(58) Field of Classification Search
CPC ...................... H04B 7/06952; H04B 7/04013; H04B 7/063; H04B 7/088; H04B 7/10; H04B 10/071
See application file for complete search history.

(56) References Cited

U.S. PATENT DOCUMENTS 5,223,847 A * 6/1993 Minter .................. G01S 13/762
342/417
9,690,402 B1 * 6/2017 Fu .......................... G06F 3/0423
(Continued)

FOREIGN PATENT DOCUMENTS

CN 112468193 A 3/2021

OTHER PUBLICATIONS

International Search Report and Written Opinion—PCT/CN2021/092647—ISA/EPO—Oct. 22, 2021 10 Pages.
(Continued)

*Primary Examiner* — Andrew Wendell
(74) *Attorney, Agent, or Firm* — Shumaker & Sieffert PA

(57) ABSTRACT

Aspects of the disclosure relate to beam sweeping with controllable reflective surfaces in the presence of co-located base stations of different network operators. A first base station that is co-located at a site with a second base station may perform a first beam sweep. The first beam sweep includes transmitting a plurality of directional beams. The first base station further transmits a control signal to a controllable reflective surface to control the controllable reflective surface to reduce a likelihood of a redirection of a directional beam of a potential second beam sweep by the second base station towards a user equipment associated with the second base station. Other aspects, embodiments, and features are also claimed and described.

30 Claims, 16 Drawing Sheets

(56)  References Cited

U.S. PATENT DOCUMENTS

| | | | | |
|---|---|---|---|---|
| 10,263,683 | B2 * | 4/2019 | Song | H04B 7/0408 |
| 10,419,948 | B1 * | 9/2019 | Labadie | H01Q 3/005 |
| 11,888,539 | B1 * | 1/2024 | Collins | H04B 17/309 |
| 2016/0329947 | A1 * | 11/2016 | Jo | H04B 7/0413 |
| 2021/0288698 | A1 * | 9/2021 | Chen | H04B 7/0617 |
| 2023/0198605 | A1 * | 6/2023 | Alkhateeb | H01Q 19/104 |
| | | | | 370/315 |
| 2023/0266458 | A1 * | 8/2023 | Liu | G01S 5/0273 |
| | | | | 342/125 |
| 2024/0014860 | A1 * | 1/2024 | Wang | H04B 7/04013 |
| 2024/0039608 | A1 * | 2/2024 | Wang | H04B 7/0695 |

OTHER PUBLICATIONS

Ji L-Y., et al., "A Reconfigurable Beam-Scanning Partially Reflective Surface (PRS) Antenna", 2015 9th European Conference on Antennas and Propagation (EUCAP), EURAAP, Apr. 13, 2015, 3 Pages, XP033212635, p. 1-p. 2.
Lu-Yang J., et al., "A Reconfigurable Partially Reflective Surface (PRS) Antenna for Beam Steering", IEEE Transactions on Antennas and Propagation, IEEE Service Center, Piscataway, NJ, US, vol. 63, No. 6, May 29, 2015, XP011582882, ISSN: 0018-926X, DOI: 10.1109/TAP.2015.2412143, 9 Pages.

* cited by examiner

300

310

308

304

N

M

302

306

800

810

814

812

| Operator A | —— |
| Operator B | - - - |

800

810

814

812

| Operator A | —— |
| Operator B | - - - |

900

905

910

1100

1490

SYNCHRONIZATION BEAM SWEEPING WITH CONTROLLABLE REFLECTIVE SURFACES IN PRESENCE OF MULTIPLE OPERATORS

This application is a national stage application under 35 U.S.C. § 371 of PCT Application No. PCT/CN2021/092647, filed May 10, 2021. The entire contents of PCT Application No. PCT/CN2021/092647 is incorporated herein by reference in its entirety.

TECHNICAL FIELD

The technology discussed below relates generally to wireless communication systems, and more particularly, controllable reflective surfaces (e.g., a reconfigurable intelligent surface (RIS)) in the presence of multiple network operators.

INTRODUCTION

Recently, controllable reflective surface technologies have been introduced to enhance wireless network throughput and enlarge cell coverage with low hardware cost and low power consumption. In general, a controllable reflective surface may extend the coverage area of a cell by reflecting or redirecting impinging signals on the surface to given directions, which can be controlled and reconfigured. As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

A controllable reflective surface may extend the coverage area of a scheduling entity (e.g., a base station) of a first operator by redirecting impinging signals or beams on the controllable reflective surface to given directions. To provide this extended coverage area, the scheduling entity of the first operator may control the controllable reflective surface to be configured to redirect signals or beams in a particular direction (e.g., towards a particular scheduled entity). Additionally, a scheduling entity of a second operator that is co-located with the scheduling entity of the first operator may inadvertently have its signals or beams redirected by the controllable reflective surface. Such inadvertent redirection of signals or beams by the controllable reflective surface may provide a scheduled entity (e.g., a user equipment (UE)) of the second operator with temporary access to the scheduling entity of the second operator. However, the first operator may subsequently reconfigure the controllable reflective surface, interrupting the access of the scheduled entity and scheduling entity of the second operator. Thus, the controllable reflective surface may introduce communication instability for a co-located scheduling entity of a second operator. In some examples, the signals or beams being inadvertently redirected are directional beams in a beam sweep transmitted by the scheduling entity of the second operator used in an initial access procedure for the scheduled entity of the second operator.

Some examples described herein reduce the likelihood that such unstable access to a scheduling entity is provided by an inadvertent redirection of a directional beam, from the scheduling entity, by a controllable reflective surface under the control of another scheduling entity at a shared site with the scheduling entity. Accordingly, some examples described herein improve the stability of access of a scheduled entity to a scheduling entity.

In one example, a method of wireless communication is disclosed. The method includes performing, by a first scheduling entity that is co-located at a site with a second scheduling entity, a first beam sweep. The first beam sweep includes transmitting a plurality of directional beams. The method further includes transmitting a control signal, by the first scheduling entity, to a controllable reflective surface to control the controllable reflective surface to reduce a likelihood of a redirection, by the controllable reflective surface, of a directional beam of a potential second beam sweep by the second scheduling entity towards a scheduled entity associated with the second scheduling entity.

In another example, an apparatus for wireless communication is disclosed. The apparatus includes means for performing, by a first scheduling entity that is co-located at a site with a second scheduling entity, a first beam sweep. The first beam sweep includes transmitting a plurality of directional beams. The apparatus further includes means for transmitting a control signal, by the first scheduling entity, to a controllable reflective surface to control the controllable reflective surface to reduce a likelihood of a redirection, by the controllable reflective surface, of a directional beam of a potential second beam sweep by the second scheduling entity towards a scheduled entity associated with the second scheduling entity.

In another example, a non-transitory computer-readable medium storing computer-executable code is disclosed. The code is for causing a computer to perform, by a first scheduling entity that is co-located at a site with a second scheduling entity, a first beam sweep. The first beam sweep includes transmitting a plurality of directional beams. The code is further for causing the computer to transmit a control signal, by the first scheduling entity, to a controllable reflective surface to control the controllable reflective surface to reduce a likelihood of a redirection, by the controllable reflective surface, of a directional beam of a potential second beam sweep by the second scheduling entity towards a scheduled entity associated with the second scheduling entity.

In another example, an apparatus for wireless communication is disclosed. The apparatus includes a processor of a first scheduling entity that is co-located at a site with a second scheduling entity. The apparatus further includes a transceiver communicatively coupled to the processor, and a memory communicatively coupled to the processor. The processor and the memory are configured to perform a first beam sweep, wherein the first beam sweep includes transmitting a plurality of directional beams. The processor and the memory are further configured to transmit a control signal to a controllable reflective surface to control the controllable reflective surface to reduce a likelihood of a redirection, by the controllable reflective surface, of a directional beam of a potential second beam sweep by the second scheduling entity towards a scheduled entity associated with the second scheduling entity.

These and other aspects of the technology discussed herein will become more fully understood upon a review of the detailed description, which follows. Other aspects, features, and embodiments will become apparent to those of ordinary skill in the art, upon reviewing the following description of specific, exemplary embodiments in conjunction with the accompanying figures. While the following description may discuss various advantages and features relative to certain embodiments and figures, all embodiments can include one or more of the advantageous features discussed herein. In other words, while this description may discuss one or more embodiments as having certain advantageous features, one or more of such features may also be used in accordance with the various embodiments discussed herein. In similar fashion, while this description may discuss exemplary embodiments as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes aspects and embodiments by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/ purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
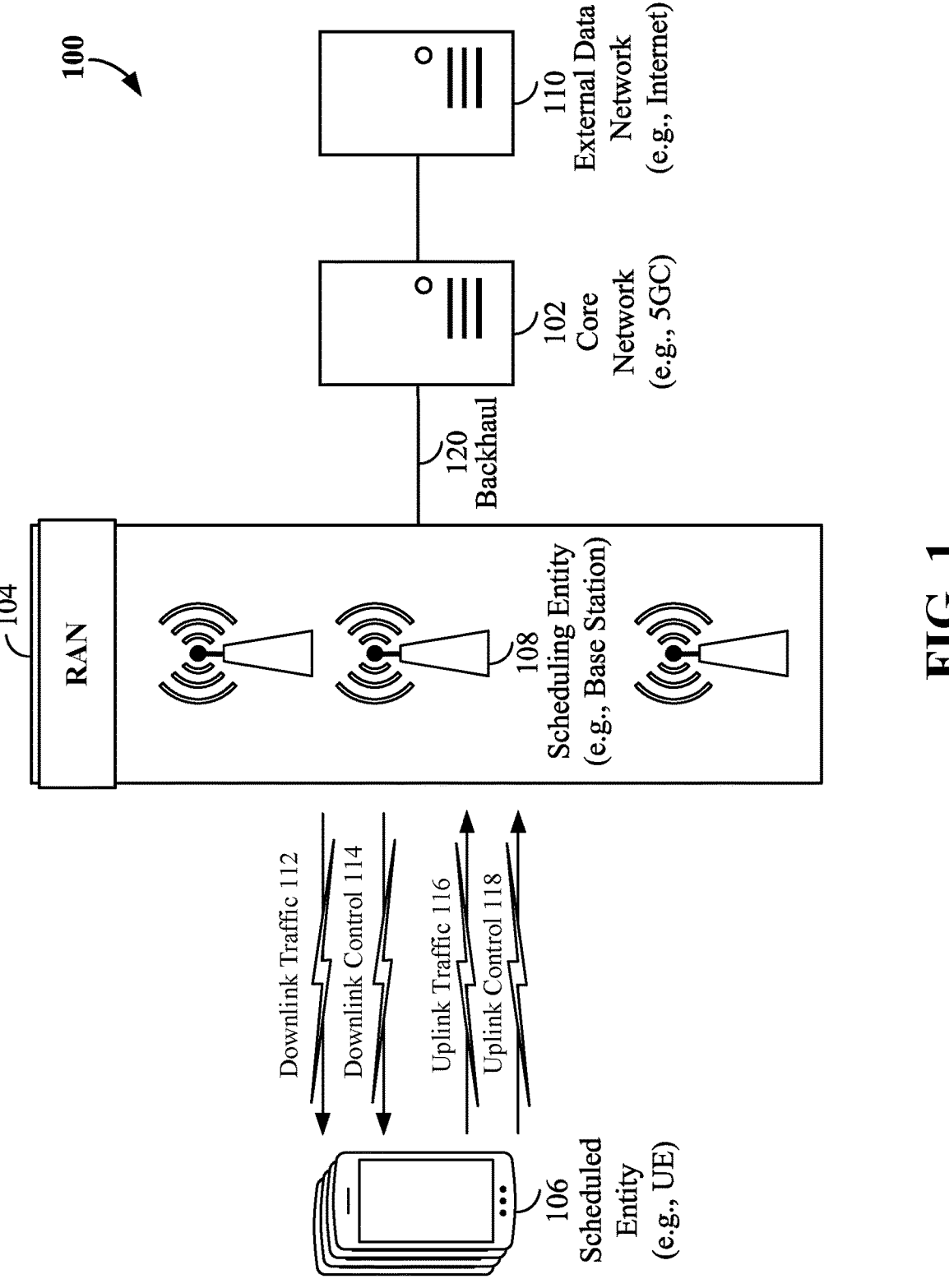
FIG. 1 is a schematic illustration of a wireless communication system according to some embodiments.

The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication system 100. The wireless communication system 100 includes several interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, those skilled in the art may variously refer to a base station as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 supports wireless communication for multiple mobile apparatuses. Those skilled in the art may refer to a mobile apparatus as user equipment (UE) in 3GPP standards, but may also refer to a mobile apparatus as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides access to network services. A UE may take on many forms and can include a range of devices.

Within the present document, a "mobile" apparatus (aka a UE) need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
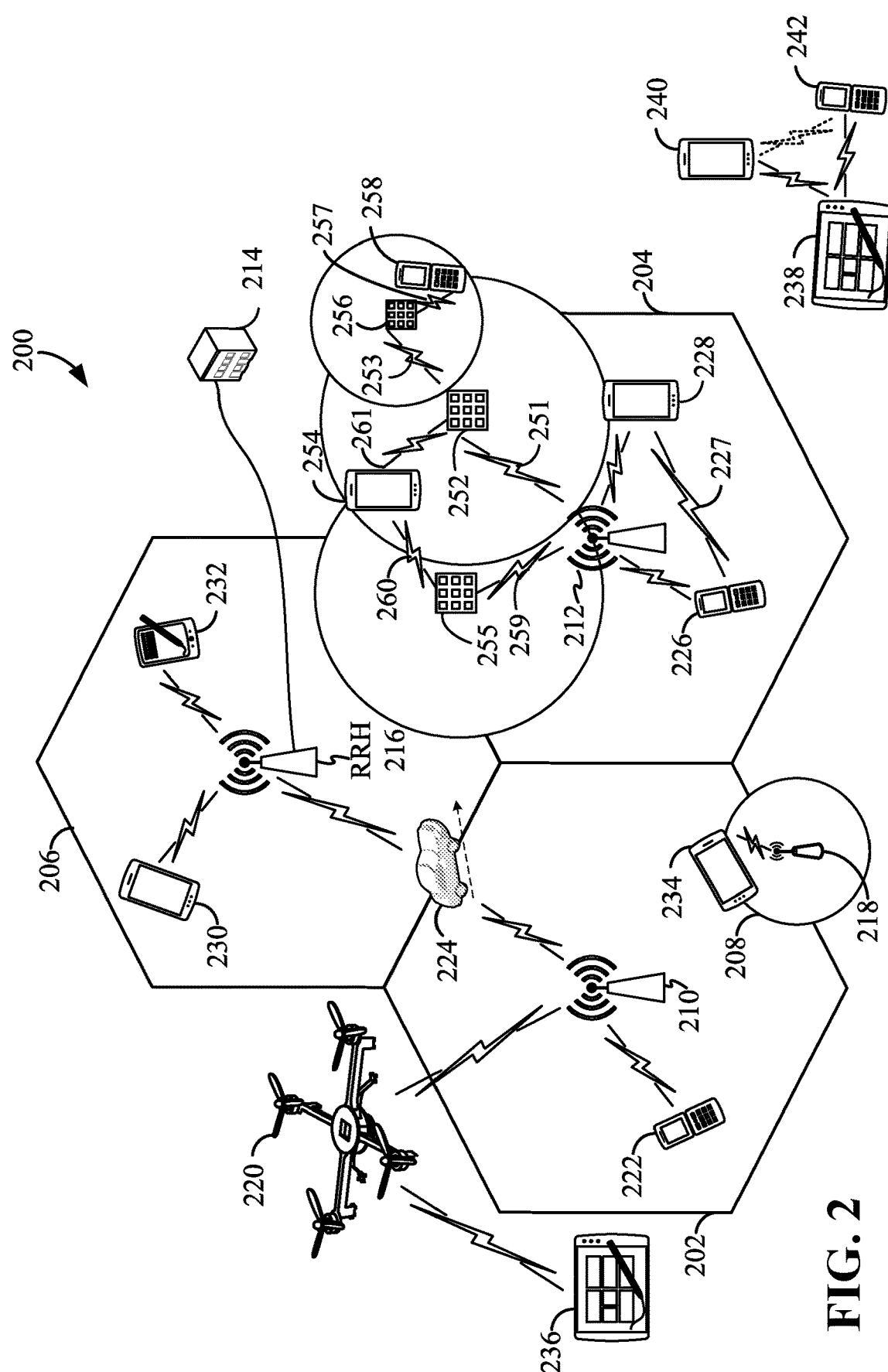
FIG. 2 is a conceptual illustration of an example of a radio access network according to some embodiments.

FIG. 2 provides a schematic illustration of a RAN 200, by way of example and without limitation. In some examples, the RAN 200 may be the same as the RAN 104 described above and illustrated in FIG. 1. The geographic area covered by the RAN 200 may be divided into cellular regions (cells) that a user equipment (UE) can uniquely identify based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

FIG. 2 shows two base stations 210 and 212 in cells 202 and 204; and shows a third base station 214 controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

The RAN 200 may include any number of wireless base stations and cells. Further, a RAN may include a relay node to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

In FIG. 2, a controllable reflective surface 252 (e.g., a reconfigurable intelligent surface (RIS) may be deployed to extend the size or coverage area of a given cell. The controllable reflective surface 252 may be within the cell 204 of the base station 212. The base station 212 may transmit signals 251 to the controllable reflective surface 252. Then, the controllable reflective surface 252 may redirect the signals 251 to a UE 254 or another controllable reflective surface 256 as redirected signals 261 or 253, respectively. While the controllable reflective surface 252 may access the UE 254 and another controllable reflective surface 256, the UE 254 and the controllable reflective surface 256 may not be within the cell 204 of the base station 212. The controllable reflective surface 256 may redirect the signals 253 received from the controllable reflective surface 252 to a different UE 258 as redirected signals 257. Similarly, although another controllable reflective surface 256 may access the UE 258, the base station 212 or the controllable reflective surface 252 may not access the UE 258 directly because the UE 258 may not be within the coverage area that the base station 212 or the controllable reflective surface 252 can serve (e.g., due an intervening blockage). In some examples, the base station 212 may communicate with the UE 254 through more than one controllable reflective surface, such as through controllable reflective surface 252 and controllable reflective surface 255. The base station 212 may transmit signals 259 and 251 to controllable reflective surfaces 252 and 255, respectively. The controllable reflective surfaces 252 and 255 may redirect the signals 259 and 251 to the UE 254 as redirected signals 261 and 260, respectively. For example, based on measurements from the UE 254 of signals through each controllable reflective surface 252, 255, the base station 212 may determine and evaluate possible channels through the controllable reflective surfaces 252, 255, and then the base station 212 may select one or both of the controllable reflective surfaces 252, 255 to communicate with the UE 254. The signals 251, 253, 257, 259, 260, and 261 have been generally described as downlink signals originating from the base station 212 and being redirected by one or more of the controllable reflective surfaces 252, 255, and 256. However, uplink signals originating from one or more of the UEs 254 and 258 may similarly be reflected by one or more of the controllable reflective surfaces 252, 255, and 256 to reach the base station 212.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. An access and mobility management function (AMF), not illustrated, part of the core network 102 in FIG. 1) may generally set up, maintain, and release the various physical channels between the UE and the radio access network. The AMF may further include a security context management function (SCMF) that manages the security context for both the control plane and the user plane functionality, and a security anchor function (SEAF) that performs authentication.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time utilizing a given resource. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
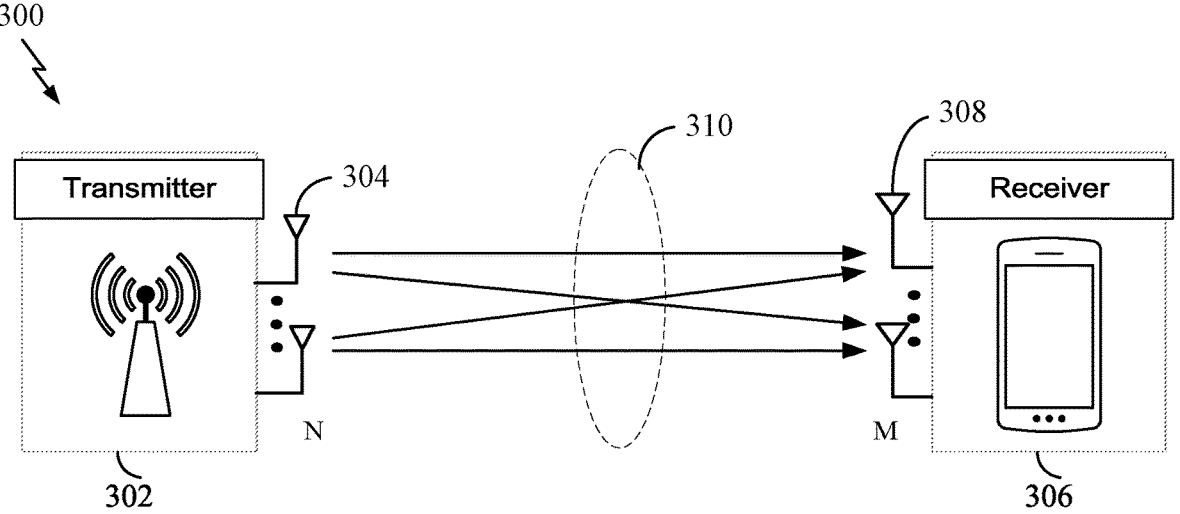
FIG. 3 is a block diagram illustrating a wireless communication system supporting multiple-input multiple-output (MIMO) communication according to some embodiments.

In some aspects of the disclosure, the scheduling entity and/or scheduled entity may be configured with multiple antennas for beamforming and/or multiple-input multiple-output (MIMO) technology. FIG. 3 illustrates an example of a wireless communication system 300 with multiple antennas, supporting beamforming and/or MIMO. The use of such multiple antenna technology enables the wireless communication system to exploit the spatial domain to support spatial multiplexing, beamforming, and transmit diversity.

Beamforming generally refers to directional signal transmission or reception. For a beamformed transmission, a transmitting device may precode, or control the amplitude and phase of each antenna in an array of antennas to create a desired (e.g., directional) pattern of constructive and destructive interference in the wavefront. In a MIMO system, a transmitter 302 includes multiple transmit antennas 304 (e.g., N transmit antennas) and a receiver 306 includes multiple receive antennas 308 (e.g., M receive antennas).

Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

In a MIMO system, spatial multiplexing may be used to transmit multiple different streams of data, also referred to as layers, simultaneously on the same time-frequency resource. In some examples, a transmitter 302 may send multiple data streams to a single receiver. In this way, a MIMO system takes advantage of capacity gains and/or increased data rates associated with using multiple antennas in rich scattering environments where channel variations can be tracked. Here, the receiver 306 may track these channel variations and provide corresponding feedback to the transmitter 302. In the simplest case, as shown in FIG. 3, a rank-2 (i.e., including 2 data streams) spatial multiplexing transmission on a 2×2 MIMO antenna configuration will transmit two data streams via two transmit antennas 304. The signal from each transmit antenna 304 reaches each receive antenna 308 along a different signal path 310. The receiver 306 may then reconstruct the data streams using the received signals from each receive antenna 308.

In some examples, a transmitter may send multiple data streams to multiple receivers. This is generally referred to as multi-user MIMO (MU-MIMO). In this way, a MU-MIMO system exploits multipath signal propagation to increase the overall network capacity by increasing throughput and spectral efficiency, and reducing the required transmission energy. This is achieved by a transmitter 302 spatially precoding (i.e., multiplying the data streams with different weighting and phase shifting) each data stream (in some examples, based on known channel state information) and then transmitting each spatially precoded stream through multiple transmit antennas to the receiving devices using the same allocated time-frequency resources. A receiver (e.g., receiver 306) may transmit feedback including a quantized version of the channel so that the transmitter 302 can schedule the receivers with good channel separation. The spatially precoded data streams arrive at the receivers with different spatial signatures, which enables the receiver(s) (in some examples, in combination with known channel state information) to separate these streams from one another and recover the data streams destined for that receiver. In the other direction, multiple transmitters can each transmit a spatially precoded data stream to a single receiver, which enables the receiver to identify the source of each spatially precoded data stream.

In some examples, as part of an initial access procedure, the transmitter 302 (e.g., a base station in a RAN such as shown in FIG. 1) performs a beam sweep of directional beams by transmitting and steering directional beams in different spatial directions via the multiple transmit antennas 304 and the aforementioned beamforming techniques. The transmitter 302 may steer at least one of the directional beams in the direction of the receiver 308 (a UE, such as scheduled entity 106 in FIG. 1), which may measure and interpret the received directional beam to synchronize with the transmitter 302 and to determine characteristics of the channel, and to synchronize a UL channel to the transmitter 302. Further details regarding initial access procedures using beam sweeping are provided below.

The number of data streams or layers in a MIMO or MU-MIMO (generally referred to as MIMO) system corresponds to the rank of the transmission. In general, the rank of a MIMO system is limited by the number of transmit or receive antennas 304 or 308, whichever is lower. In addition, the channel conditions at the receiver 306, as well as other considerations, such as the available resources at the transmitter 302, may also affect the transmission rank. For example, a base station in a RAN (e.g., transmitter 302) may assign a rank (and therefore, a number of data streams) for a DL transmission to a particular UE (e.g., receiver 306) based on a rank indicator (RI) the UE transmits to the base station. The UE may determine this RI based on the antenna configuration (e.g., the number of transmit and receive antennas) and a measured signal-to-interference-and-noise ratio (SINR) on each of the receive antennas. The RI may indicate, for example, the number of layers that the UE may support under the current channel conditions. The base station may use the RI along with resource information (e.g., the available resources and amount of data to be scheduled for the UE) to assign a DL transmission rank to the UE.

The transmitter 302 determines the precoding of the transmitted data stream or streams based, e.g., on known channel state information of the channel on which the transmitter 302 transmits the data stream(s). For example, the transmitter 302 may transmit one or more suitable reference signals (e.g., a channel state information reference signal, or CSI-RS) that the receiver 306 may measure. The receiver 306 may then report measured channel quality information (CQI) back to the transmitter 302. This CQI generally reports the current communication channel quality, and in some examples, a requested transport block size (TBS) for future transmissions to the receiver. In some examples, the receiver 306 may further report a precoding matrix indicator (PMI) to the transmitter 302. This PMI generally reports the receiver's 306 preferred precoding matrix for the transmitter 302 to use, and may be indexed to a predefined codebook. The transmitter 302 may then utilize this CQI/PMI to determine a suitable precoding matrix for transmissions to the receiver 306.

In Time Division Duplex (TDD) systems, the UL and DL may be reciprocal, in that each uses different time slots of the same frequency bandwidth. Therefore, in TDD systems, a transmitter 302 may assign a rank for DL MIMO transmissions based on an UL SINR measurement (e.g., based on a sounding reference signal (SRS) or other pilot signal transmitted from the receiver 306). Based on the assigned rank, the transmitter 302 may then transmit a channel state information reference signal (CSI-RS) with separate sequences for each layer to provide for multi-layer channel estimation. From the CSI-RS, the receiver 306 may measure the channel quality across layers and resource blocks. The receiver 306 may then transmit a CSI report (including, e.g., CQI, RI, and PMI) to the transmitter 302 for use in updating the rank and assigning resources for future DL transmissions.

The air interface in the radio access network 200 may utilize one or more multiplexing and multiple access algorithms to enable simultaneous communication of the various devices. For example, with reference to FIG. 2, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes. For example, UEs described herein may provide for UL multiple access utilizing time division multiple access (TDMA), code division multiple access (CDMA), frequency division multiple access (FDMA), sparse code multiple access (SCMA), resource spread multiple access (RSMA), or other suitable multiple access schemes. Further, base stations described herein may multiplex DL transmissions to UEs utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 4:
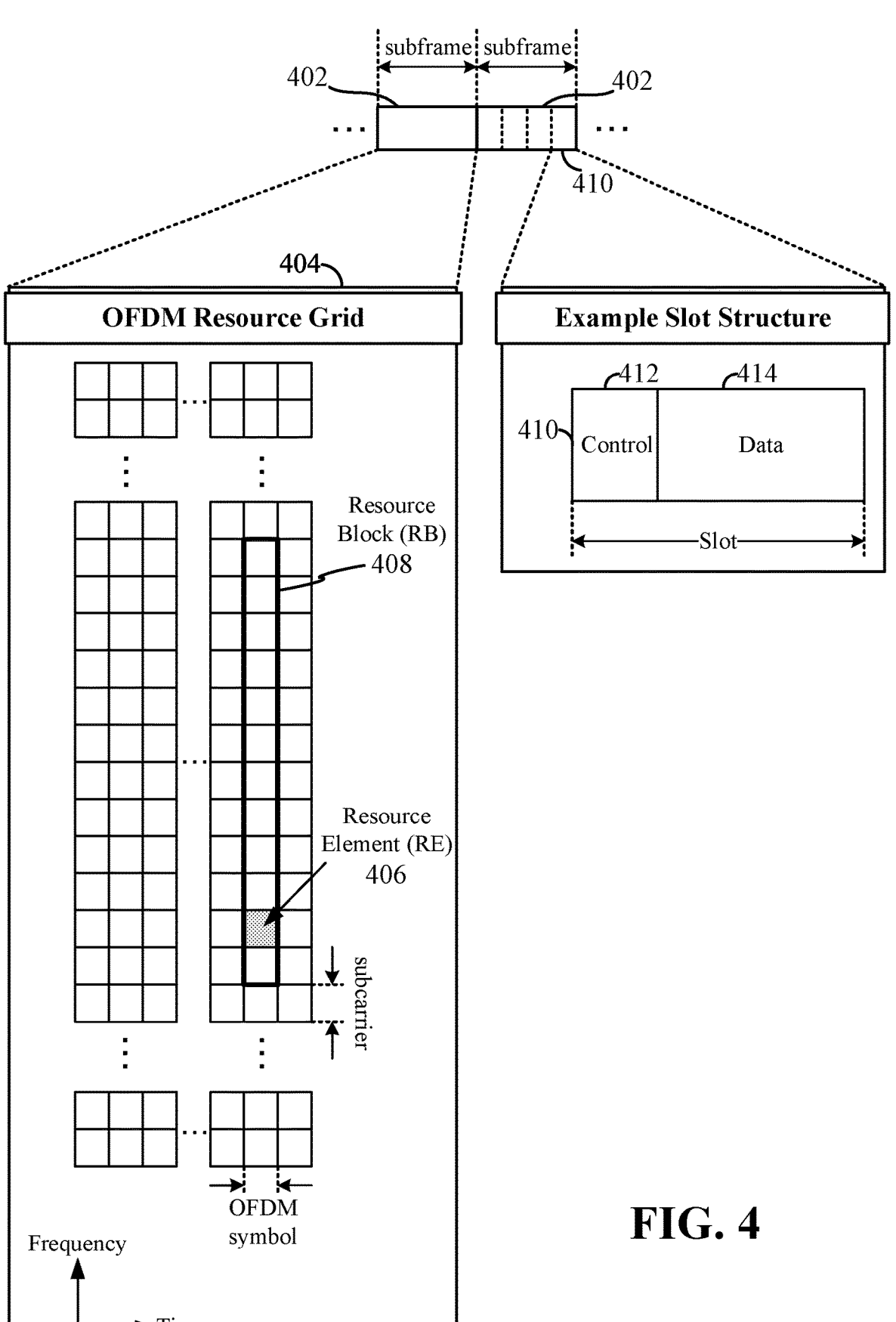
FIG. 4 is an expanded view of an example downlink subframe according to some embodiments.

FIG. 4 schematically illustrates various aspects of the present disclosure with reference to an OFDM waveform. Those of ordinary skill in the art should understand that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

In some examples, a frame may refer to a predetermined duration of time (e.g., 10 ms) for wireless transmissions. And further, each frame may consist of a set of subframes (e.g., 10 subframes of 1 ms each). A given carrier may include one set of frames in the UL, and another set of frames in the DL. FIG. 4 illustrates an expanded view of an exemplary DL subframe 402, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and may contain a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. The present disclosure assumes, by way of example, that a single RB such as the RB 408 entirely corresponds to a single direction of communication (either transmission or reception for a given device).

A UE generally utilizes only a subset of the resource grid 404. An RB may be the smallest unit of resources that a scheduler can allocate to a UE. Thus, the more RBs scheduled for a UE, and the higher the modulation scheme chosen for the air interface, the higher the data rate for the UE.

In this illustration, the RB 408 occupies less than the entire bandwidth of the subframe 402, with some subcarriers illustrated above and below the RB 408. In a given implementation, the subframe 402 may have a bandwidth corresponding to any number of one or more RBs 408. Further, the RB 408 is shown occupying less than the entire duration of the subframe 402, although this is merely one possible example.

Each 1 ms subframe 402 may consist of one or multiple adjacent slots. In FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). A base station may in some cases transmit these mini-slots occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Although not illustrated in FIG. 4, the various REs 406 within an RB 408 may carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry one or more DL control channels. These DL control channels include DL control information 114 (DCI) that generally carries information originating from higher layers, such as a physical broadcast channel (PBCH), a physical downlink control channel (PDCCH), etc., to one or more scheduled entities 106. In addition, the transmitting device may allocate one or more DL REs to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

A base station may transmit the synchronization signals PSS and SSS (collectively referred to as SS), and in some examples, the PBCH, in an SS block that includes 4 consecutive OFDM symbols, numbered via a time index in increasing order from 0 to 3. The PSS may include a cell ID sector (e.g., that may be one of three values) and the SSS may include a cell ID group (e.g., that may be one of 336 values). In the frequency domain, the SS block may extend over 240 contiguous subcarriers, with the subcarriers being numbered via a frequency index in increasing order from 0 to 239. Of course, the present disclosure is not limited to this specific SS block configuration. Other nonlimiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize one or more REs 406 to carry one or more UL control channels, such as a physical uplink control channel (PUCCH), a physical random access channel (PRACH), etc. These UL control channels include UL control information 118 (UCI) that generally carries information originating from higher layers. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. The RAN may provide this system information utilizing minimum system information (MSI), and other system information (OSI). The RAN may periodically broadcast the MSI over the cell to provide the most basic information a UE requires for initial cell access, and for enabling a UE to acquire any OSI that the RAN may broadcast periodically or send on-demand. In some examples, a network may provide MSI over two different downlink channels. For example, the PBCH may carry a master information block (MIB), and the PDSCH may carry a system information block type 1 (SIB1). Here, the MIB may provide a UE with parameters for monitoring a control resource set. The control resource set may thereby provide the UE with scheduling information corresponding to the PDSCH, e.g., a resource location of SIB1. In the art, SIB1 may be referred to as remaining minimum system information (RMSI). The UE may use the information provided by the SIB1 to initiate a random access procedure to request resources to communicate with the RAN.

OSI may include any SI that is not broadcast in the MSI. In some examples, the PDSCH may carry a plurality of SIBs, not limited to SIB1, discussed above. Here, the RAN may provide the OSI in these SIBs, e.g., SIB2 and above.

The channels or carriers described above and illustrated in FIG. 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

Figure 5:
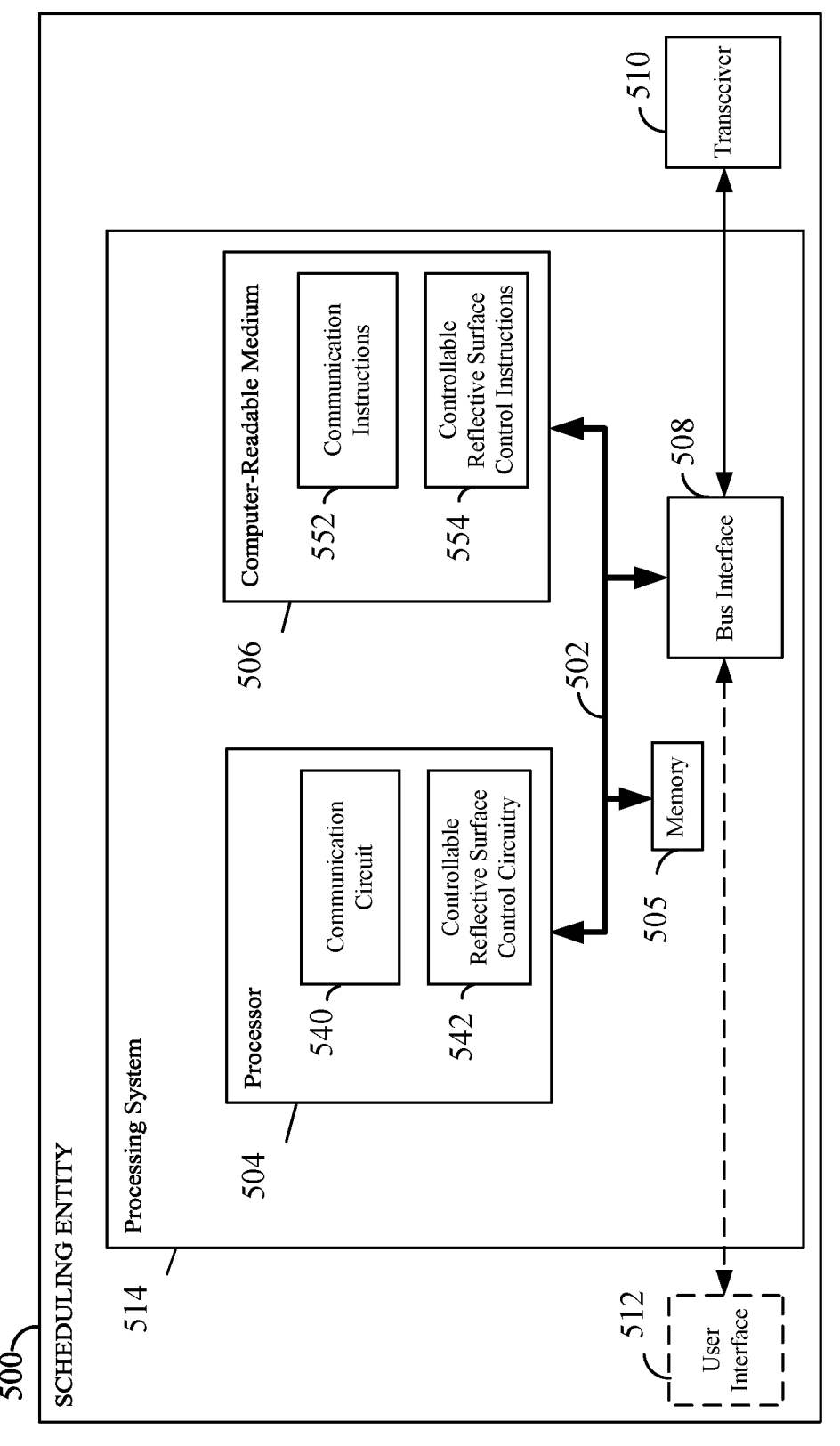
FIG. 5 is a block diagram conceptually illustrating an example of a hardware implementation for a scheduling entity according to some embodiments.

FIG. 5 is a block diagram illustrating an example of a hardware implementation for a scheduling entity 500 employing a processing system 514. For example, the scheduling entity 500 may be a user equipment (UE) as illustrated in any one or more of FIGS. 1, 2, and/or 3. In another example, the scheduling entity 500 may be a base station as illustrated in any one or more of FIGS. 1, 2, and/or 3. Additionally, the scheduling entity 500 may be an example of one or more of the below-described base stations 704, 802, 804, 812, 814, 1002, 1004, 1012, 1014, 1202, 1204, 1212, 1214, 1402, and 1404.

The scheduling entity 500 may include a processing system 514 having one or more processors 04. Examples of processors 75504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 500 may be configured to perform any one or more of the functions described herein. That is, the processor 504, as utilized in a scheduling entity 500, may be configured (e.g., in coordination with the memory 505) to implement any one or more of the processes and procedures described below and illustrated in FIGS. 9, 11, and 13.

The processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a communication interface or means for communicating with various other apparatus over a transmission medium. Depending upon the nature of the apparatus, a user interface 512 (e.g., keypad, display, speaker, microphone, joystick) may also be provided. Of course, such a user interface 512 is optional, and some examples, such as a base station, may omit it.

In some aspects of the disclosure, the processor 504 may include communication circuitry 540 configured (e.g., in coordination with the memory 505) for various functions, including, e.g., performing a beam sweep including transmitting directional beams as part of an initial access procedure and receiving communications from scheduled entities (e.g., UEs) as part of an initial access procedure. For example, the communication circuitry 540 may be configured to implement one or more of the functions described below in relation to FIG. 9 including, e.g., block 905, to FIG. 11 including, e.g., block 1105, and to FIG. 13, e.g., including block 1305. In some aspects of the disclosure, the processor 504 may include controllable reflective surface control circuitry 542 configured (e.g., in coordination with the memory 505) for various functions, including, e.g., transmitting control signals to a controllable reflective surface to configure the controllable reflective surface to redirect signals impinging the controllable reflective surface in a particular manner (e.g., in a particular direction). For example, the controllable reflective surface control circuitry 542 may be configured to implement one or more of the functions described below in relation to FIG. 9 including, e.g., block 910, to FIG. 11 including, e.g., block 1120 and to FIG. 13, e.g., including block 1340.

The processor 504 is responsible for managing the bus 502 and general processing, including the execution of software stored on the computer-readable medium 506. The software, when executed by the processor 504, causes the processing system 514 to perform the various functions described below for any particular apparatus. The processor 504 may also use the computer-readable medium 506 and the memory 505 for storing data that the processor 504 manipulates when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 506 may store computer-executable code that includes communication instructions 552 that configure a scheduling entity 500 for various functions, including, e.g., performing a beam sweep including transmitting directional beams as part of an initial access procedure and receiving communications from scheduled entities (e.g., UEs) as part of an initial access procedure. For example, the communication instructions 552 may be configured to cause a scheduling entity 500 to implement one or more of the functions described below in relation to FIG. 9 including, e.g., block 905, to FIG. 11 including, e.g., block 1105, and to FIG. 13, e.g., including block 1305.

In one or more examples, the computer-readable storage medium 506 may store computer-executable code that includes controllable reflective surface control instructions 554 that configure a scheduling entity 500 for various functions, including, e.g., transmitting control signals to a controllable reflective surface to configure the controllable reflective surface to redirect signals impinging the controllable reflective surface in a particular manner (e.g., direction). For example, the controllable reflective surface control instructions 554 may be configured to cause a scheduling entity 500 to implement one or more of the functions described below in relation to FIG. 9 including, e.g., block 910, to FIG. 11 including, e.g., block 1120 and to FIG. 13, e.g., including block 1340.

In one configuration, the scheduling entity 500 is an apparatus for wireless communication that includes means for performing a beam sweep including transmitting directional beams as part of an initial access procedure, means for receiving communications from scheduled entities (e.g., UEs) as part of an initial access procedure, and means for transmitting control signals to a controllable reflective surface to configure the controllable reflective surface to redirect signals impinging the controllable reflective surface in a particular manner (e.g., direction). In one aspect, the aforementioned means may be the processor 504 shown in FIG. 5 configured to perform the functions recited by the aforementioned means. In another aspect, the aforementioned means may be a circuit or any apparatus configured to perform the functions recited by the aforementioned means.

Figure 8A:
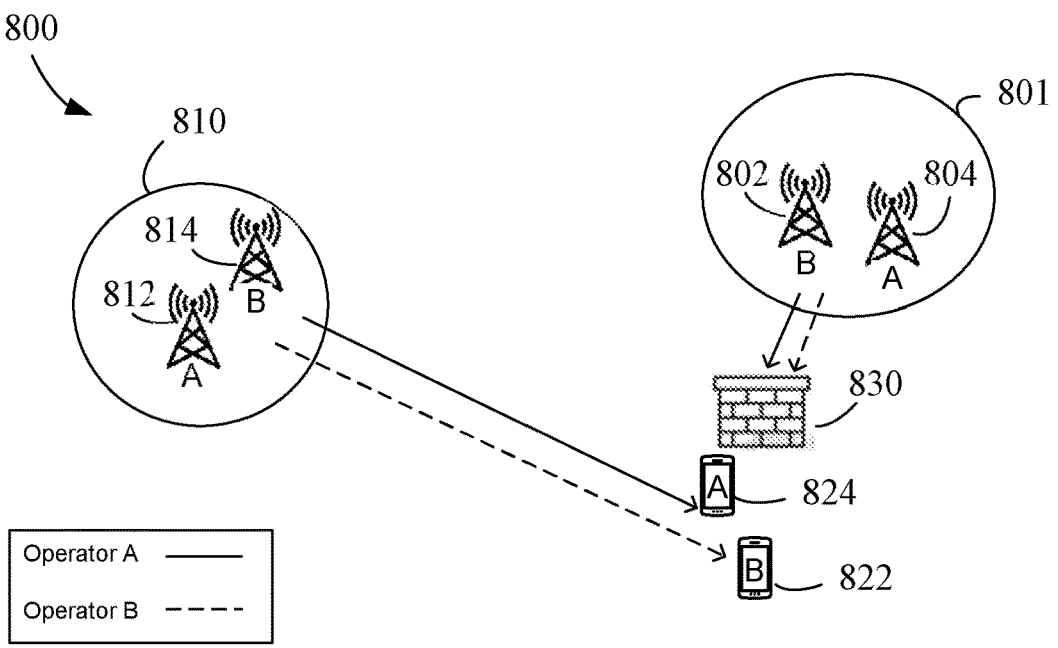
FIGS. 8A-B are diagrams illustrating a wireless communication system having a shared site with multiple scheduling entities according to some embodiments.
Figure 8B:
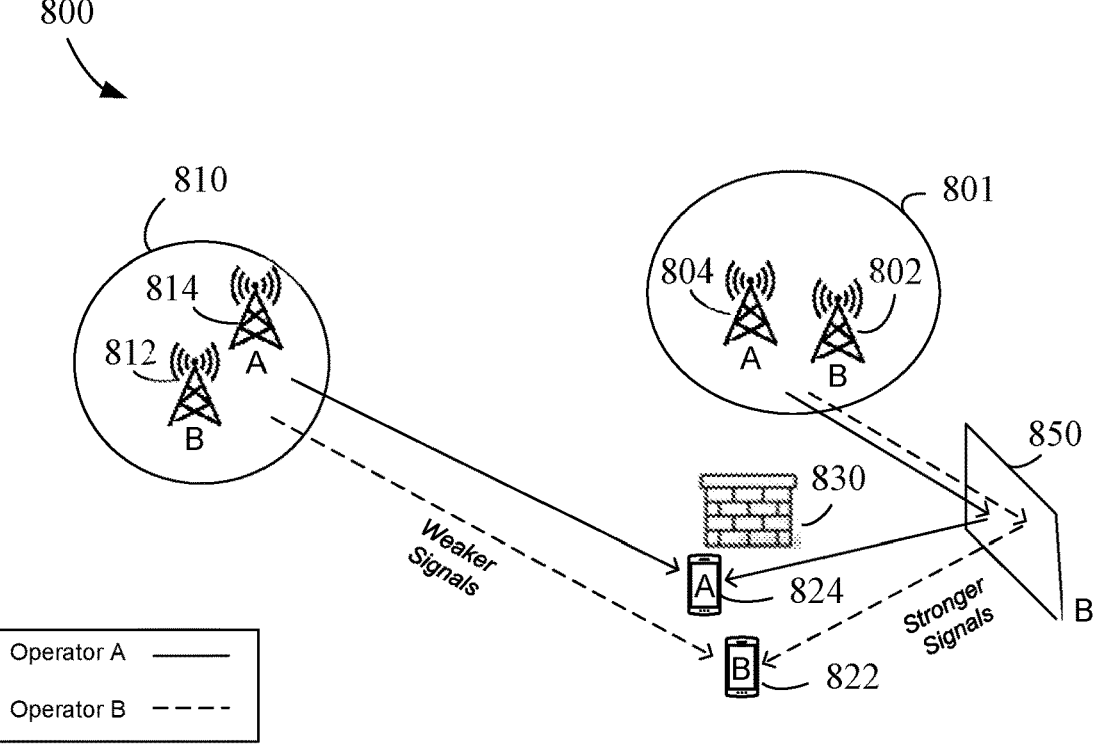
Figure 9:
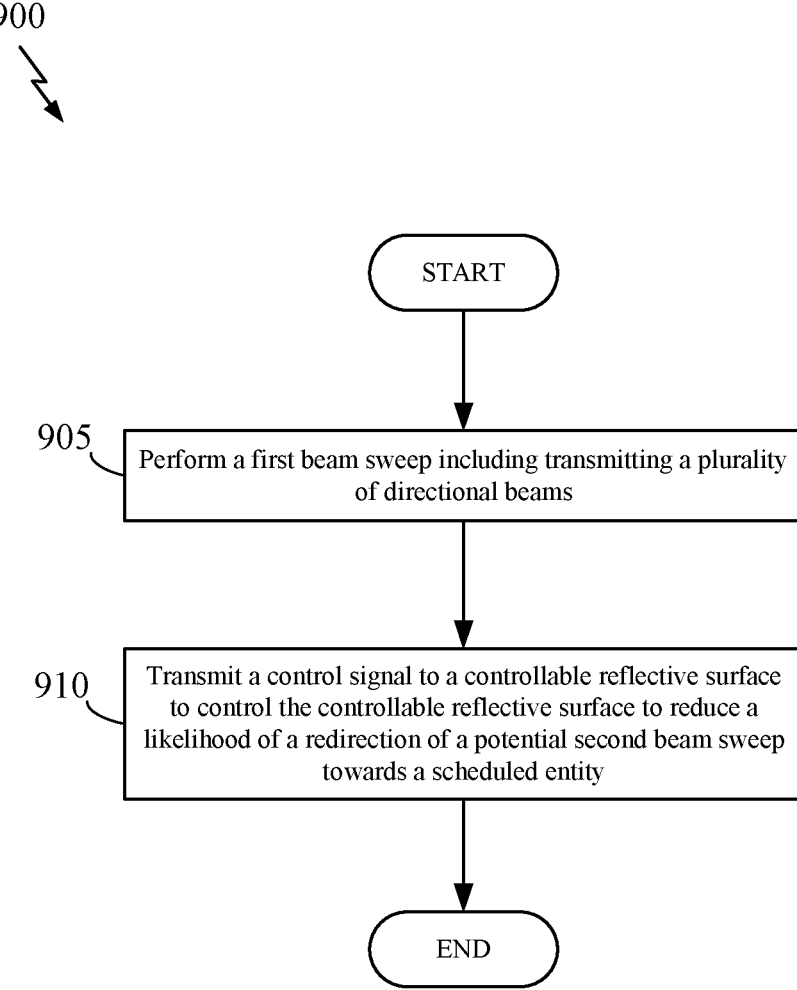
FIG. 9 is a flow chart illustrating an exemplary process for wireless communication according to some embodiments.
Figure 10A:
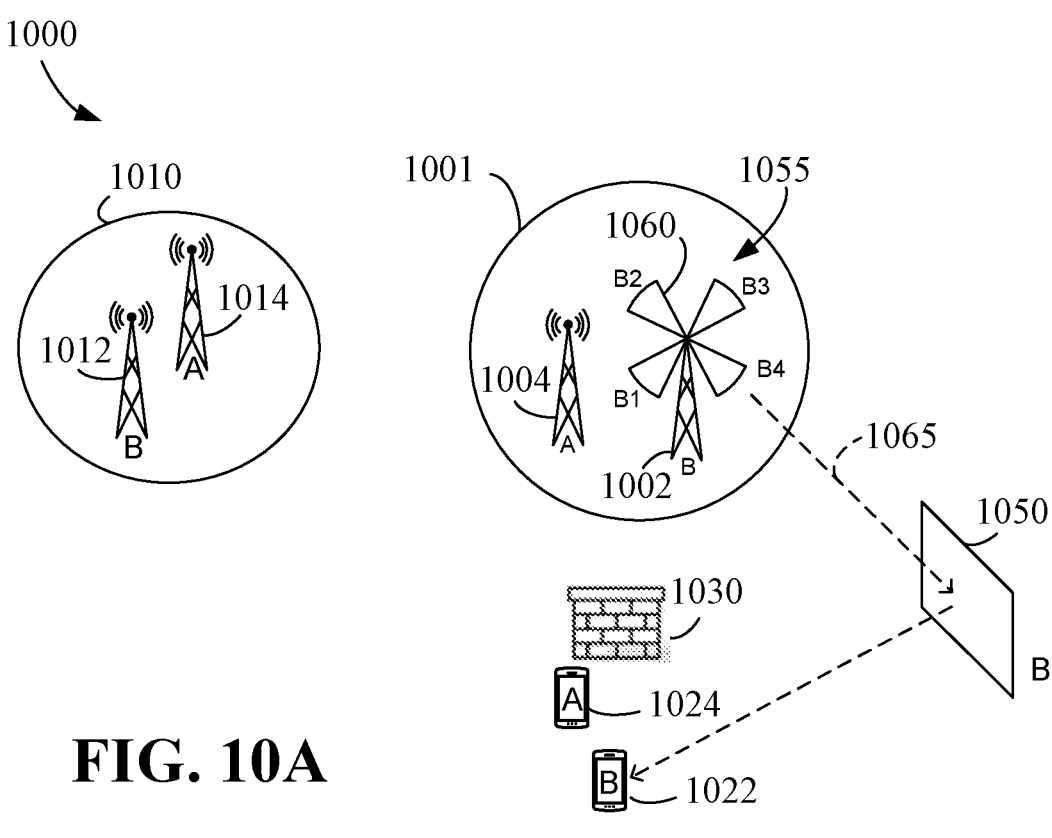
FIGS. 10A-B are diagrams illustrating a wireless communication system having a shared site with multiple scheduling entities according to some embodiments.
Figure 10B:
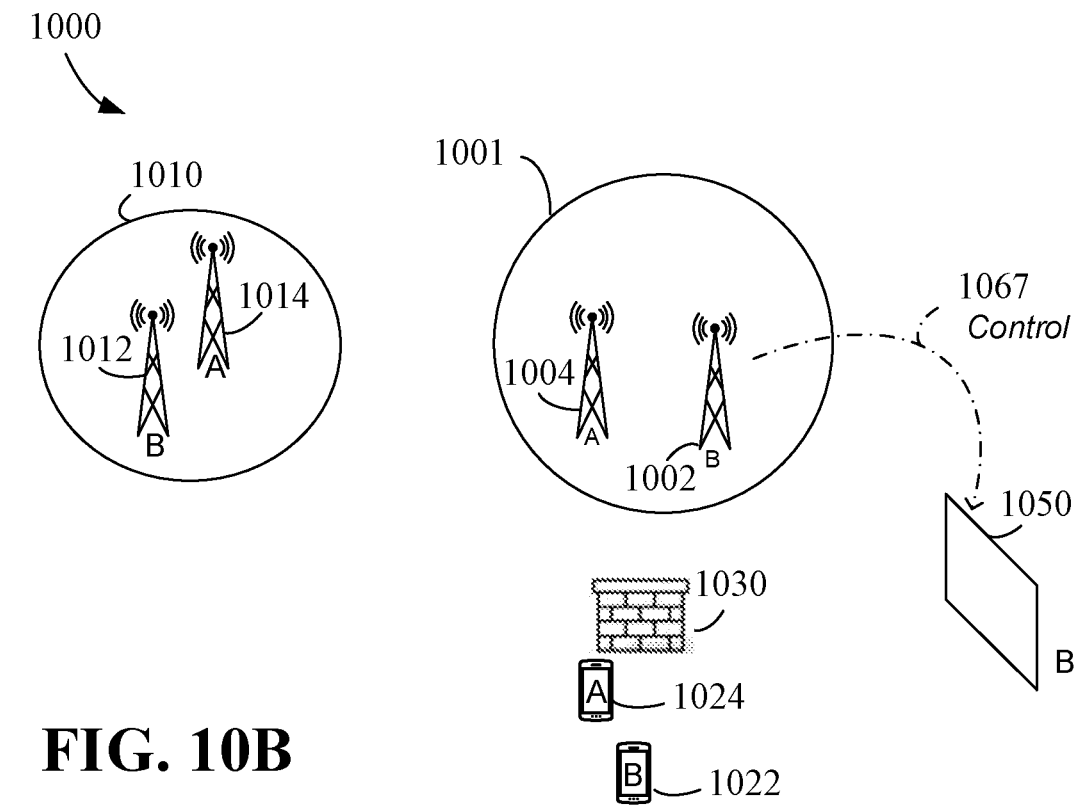
Figure 11:
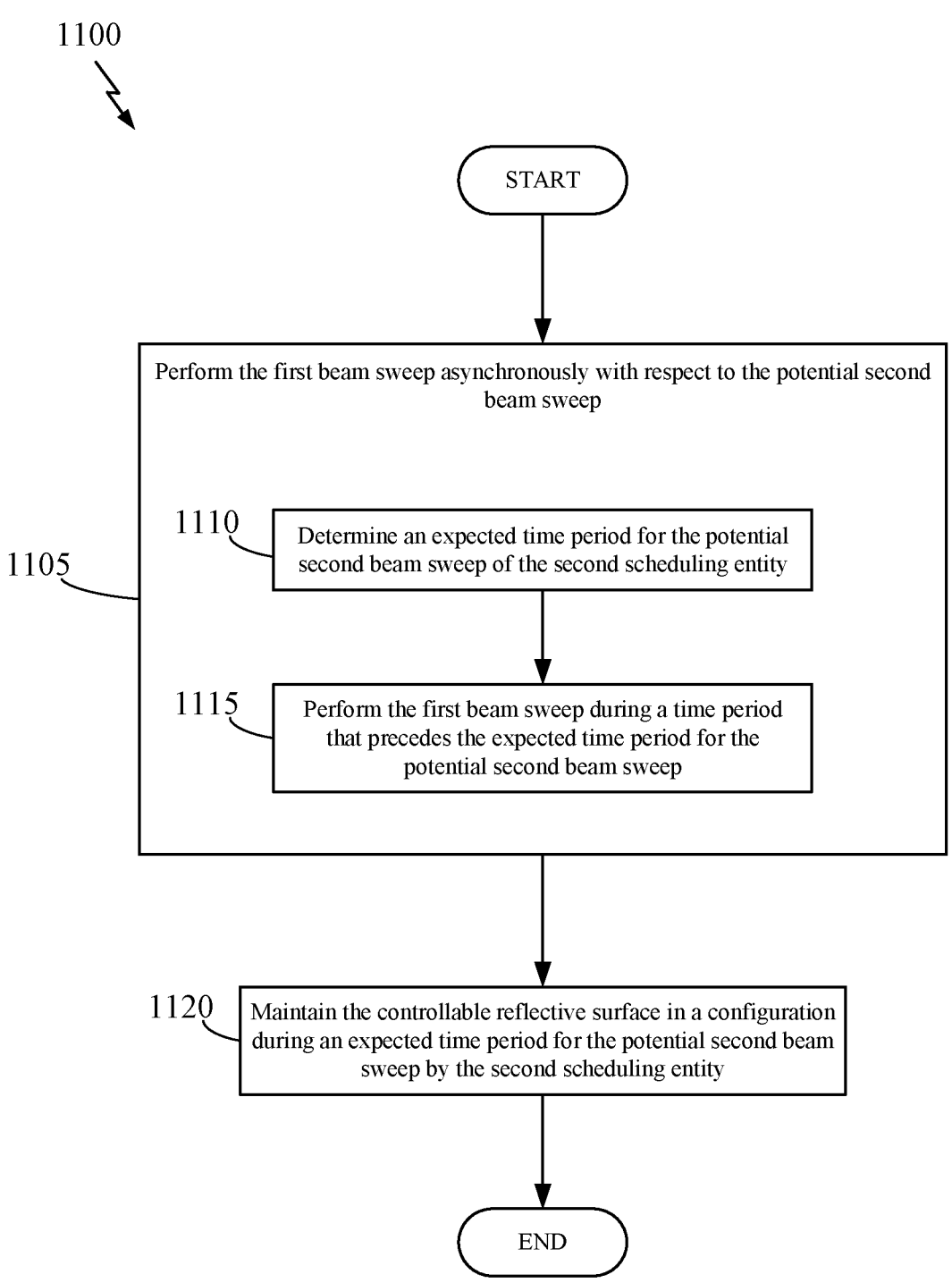
FIG. 11 is a flow chart illustrating an exemplary process for asynchronous beam sweeping according to some embodiments.

Of course, in the above examples, the circuitry included in the processor 504 is merely provided as an example, and other means for carrying out the described functions may be included within various aspects of the present disclosure, including but not limited to the instructions stored in the computer-readable storage medium 506, or any other suitable apparatus or means described in any one of the FIGS. 1, 2, 3, 4, 8A-B, 10A-B, 12A-D, and/or 14A-C and utilizing, for example, the processes and/or algorithms described herein in relation to FIGS. 9, 11, and/or 13.

Figure 6:
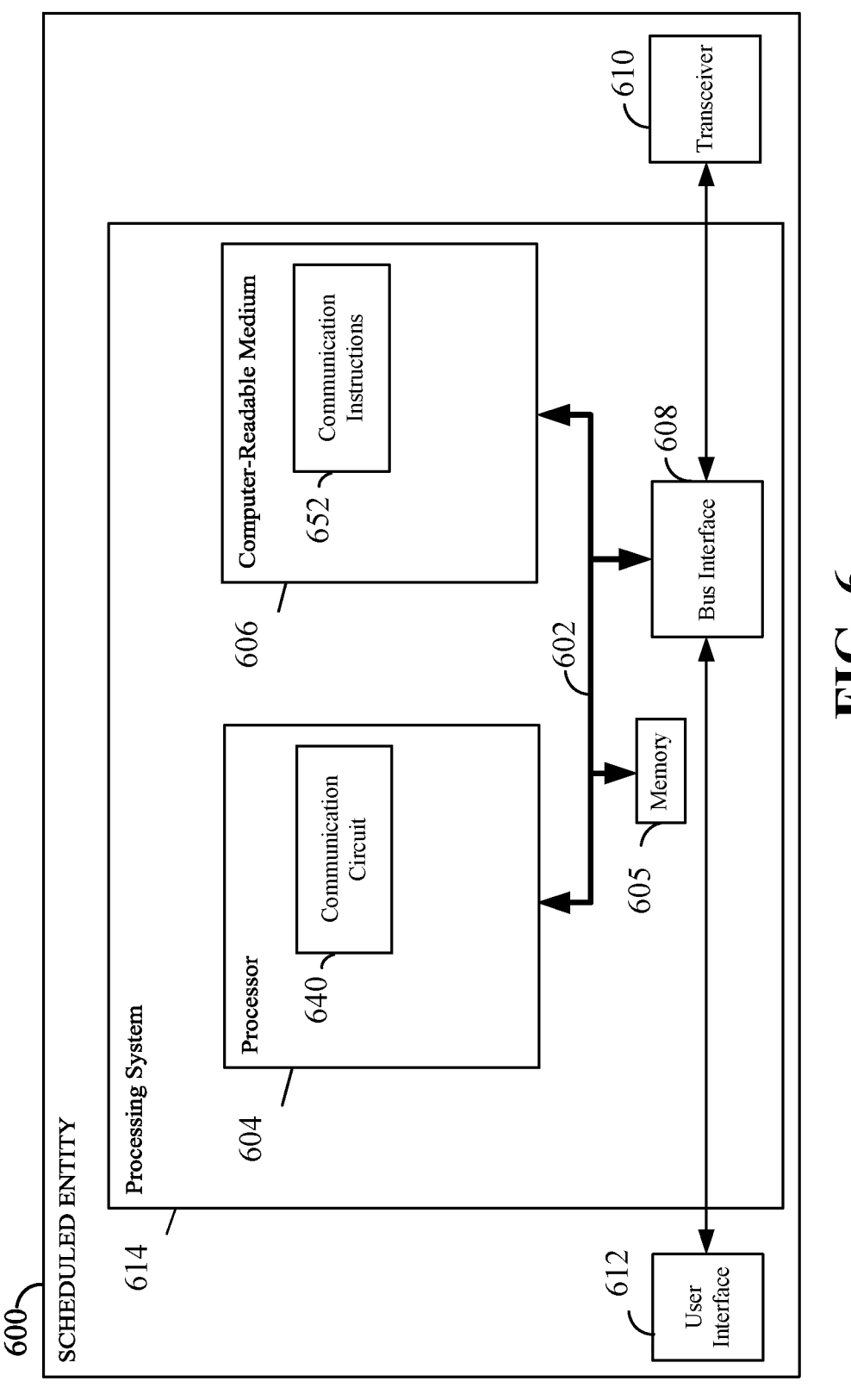
FIG. 6 is a block diagram conceptually illustrating an example of a hardware implementation for a scheduled entity according to some embodiments.

FIG. 6 is a conceptual diagram illustrating an example of a hardware implementation for an exemplary scheduled entity 600 employing a processing system 614. In accordance with various aspects of the disclosure, a processing system 614 may include an element, or any portion of an element, or any combination of elements having one or more processors 604. For example, the scheduled entity 600 may be a user equipment (UE) as illustrated in any one or more of FIGS. 1, 2, and/or 3. Additionally, the scheduled entity 600 may be an example of one or more of the below-described scheduled entities 706, 718, 822, 824, 1022, 1024, 1222, 1224, 1422, and 1424.

The processing system 614 may be substantially the same as the processing system 514 illustrated in FIG. 5, including a bus interface 608, a bus 602, memory 605, a processor 604, and a computer-readable medium 606. Furthermore, the scheduled entity 600 may include a user interface 612 and a transceiver 610 substantially similar to those described above in FIG. 5.

In some aspects of the disclosure, the processor 604 may include communication circuitry 640 configured (e.g., in coordination with the memory 605) for various functions, including, for example, receiving and interpreting directional beams transmitted by a scheduling entity (e.g., as part of a beam sweep of an initial access procedure); providing feedback regarding the directional beams to the scheduling entity as part of an initial access procedure.

And further, the computer-readable storage medium 606 may store computer-executable code that includes communication instructions 652 that configure a scheduled entity 600 for various functions, including, for example, receiving and interpreting directional beams transmitted by a scheduling entity (e.g., as part of a beam sweep of an initial access procedure); providing feedback regarding the directional beams to the scheduling entity as part of an initial access procedure.

In one configuration, the apparatus 600 for wireless communication includes means for receiving and interpreting directional beams transmitted by a scheduling entity (e.g., as part of a beam sweep of an initial access procedure); and means for providing feedback regarding the directional beams to the scheduling entity as part of an initial access procedure. In one aspect, the aforementioned means may be the processor 604 shown in FIG. 6 configured to perform the functions recited by the aforementioned means. In another aspect, the aforementioned means may be a circuit or any apparatus configured to perform the functions recited by the aforementioned means.

Of course, in the above examples, the circuitry included in the processor 604 is merely provided as an example, and other means for carrying out the described functions may be included within various aspects of the present disclosure, including but not limited to the instructions stored in the computer-readable storage medium 606, or any other suitable apparatus or means described in any one of the FIGS. 1, 2, 3, 4, 7, 8A-B, 10A-B, 12A-D, and/or 14A-C.

Controllable Reflective Surfaces

In 5G NR, base stations incorporating massive multiple-input multiple-output (MIMO) antennas can play a role in increasing throughput. In some examples, these base stations achieve increased throughput by incorporating active antenna units (AAUs) with high beamforming gain and antenna ports that each may have an individual radio frequency transceiver chain. However, adding base stations with AAUs to expand coverage of a network may result in a significant increase in expenses and, due to their active electronic components, a significant increase in power consumption.

Figure 7:
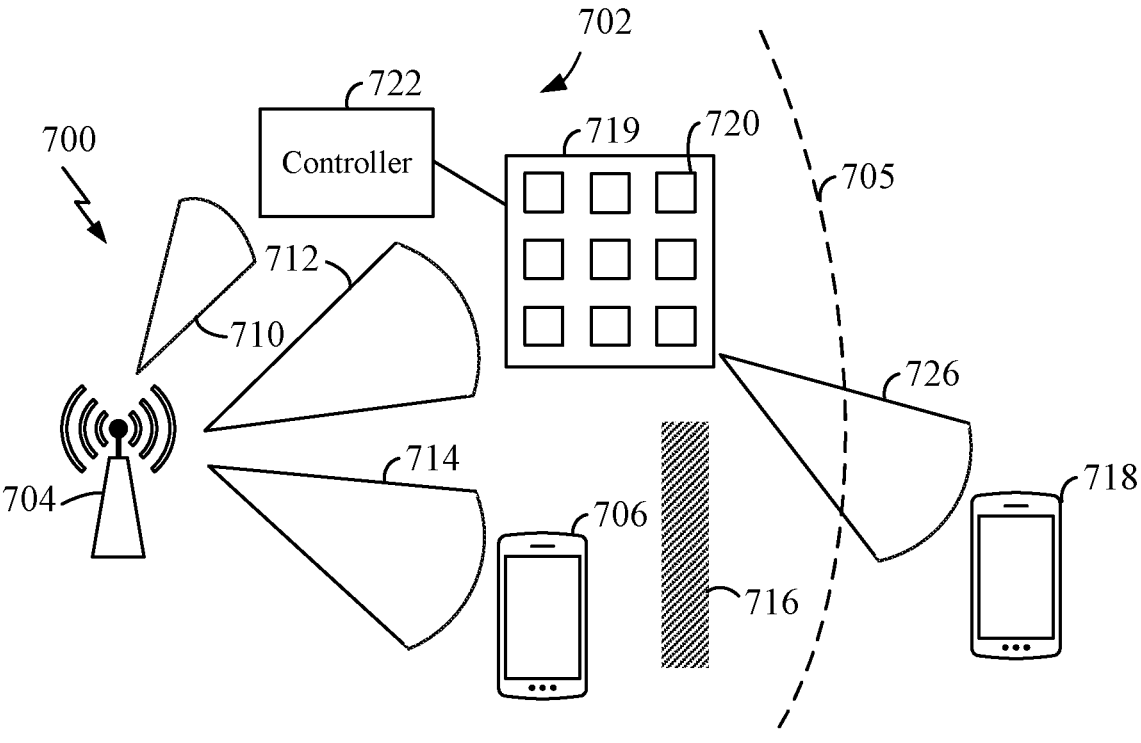
FIG. 7 is a diagram illustrating a wireless communication system including a controllable reflective surface according to some embodiments.

Therefore, in some other examples, to expand network coverage with reduced power consumption and expense, a controllable reflective surface is used. For example, FIG. 7 illustrates a communication system 700 including a controllable reflective surface 702 that may expand communication coverage and/or create additional propagation paths for a scheduling entity 704. The scheduling entity 704 may be, for example, implemented by the scheduling entity 500 of FIG. 5 and may serve as, for example, a base station. The scheduling entity 704 may support a coverage area 705 in which one or more scheduled entities (e.g., a scheduled entity 706) can access the scheduling entity 704 based on a signal or beam transmitted from the scheduling entity 704. To support the coverage area 705, the scheduling entity 704 may further be configured to transmit signals or beams in various directions (e.g., using beamforming techniques such as those described herein). For example, as illustrated in FIG. 7, the scheduling entity 704 is configured to transmit a first beam 710, a second beam 712, and a third beam 714 each in a respective (different) direction. The beams 710, 712, and 714 may also be referred to as directional beams. As also illustrated, a scheduled entity 718 may be prevented from directly accessing the scheduling entity 704 because of a blockage 716 located between the two devices and/or because the scheduled entity 718 is located outside of the coverage area 705. As described below, the controllable reflective surface 702 can expand the coverage of the scheduling entity 704 such that the scheduling entity 704 can communicate with the scheduled entity 718 that is positioned behind the blockage 716 and/or outside of the coverage area 705.

The controllable reflective surface 702 may include a surface or panel 719, having a two-dimensional array of discrete antenna elements 720, and a controllable reflective surface controller 722 (herein, surface controller 722). The antenna elements 720 may have modifiable properties, including absorption, reflection, refraction, and/or diffraction, that change the effect that the antenna elements 720 have on an impinging or reflecting beam (i.e., a beam that impinges on the controllable reflective surface 702). The surface controller 722 is coupled, e.g., via a wireless and/or wired connection, to the controllable reflective surface 702. The surface controller 722 configures the properties of the antenna elements 720 to control, direct, or modify one or more of the phase, amplitude, frequency, or polarization of impinging beams and, thereby, redirect the impinging beams in a particular direction or inhibit redirection of impinging beams. For example, the surface controller 722 may provide control signals to the controllable reflective surface 702 that indicate a direction in which an impinging beam (i.e., a beam that impinges on the controllable reflective surface 702) should be redirected. In response to the control signals, the antenna elements 720 may be configured to affect or influence their filtering characteristics, e.g., to redirect impinging beams in the indicated direction. Additionally, the surface controller 722 may provide control signals to the controllable reflective surface 702 to selectively enable and disable beam redirection. For example, in response to control signals to disable signal redirection, the antenna elements 720 may be configured to absorb impinging beams, rather than redirect impinging beams. The surface controller 722 may control the antenna elements 720, individually or on a group level. In some examples, each antenna element 720 may include a tunable local resistance and/or reactance (e.g., controlled by the surface controller 722). Based on the selected resistance and reactance, the antenna element 720 will redirect the impinging beam in a particular direction or will absorb the impinging beam (to inhibit redirection). In some examples, the antenna elements 720 may be considered phase adders that are configured to shift the phase of an impinging beam to redirect or inhibit the impinging beam.

In some examples, the surface controller 722 includes a processing system, similar to the processing system 514, having a processor, computer readable medium storing instructions, a memory, a bus interface. The processing system of the surface controller 722 enables the surface controller 722 to implement the functionality of the surface controller 722 described herein, such as configuring the controllable reflective surface 702 and its antenna elements 720. For example, the processor may execute instructions stored on the computer readable medium or may include circuitry to implement this functionality. In some examples, the surface controller 722 further includes a transceiver to communicate with an associated scheduling entity, such as the scheduling entity 704.

The controllable reflective surface 702 may also be referred to as a reconfigurable intelligent surface (RIS), an intelligent reflecting surface (IRS), a large intelligent surface (LIS), a controllable reflective surface, a software-controlled metasurface, or any other suitable terminology. The controllable reflective surface 702, may be, for example, a surface of electromagnetic (EM) material, which can be reconfigurable or electronically controllable with integrated electronics.

As noted above, the controllable reflective surface 702 can expand the coverage of the scheduling entity 704 such that the scheduling entity 704 and the scheduled entity 718 can communicate even though the scheduled entity 718 may have little or no direct access to the scheduling entity 704. The scheduled entity 718 may not have direct access to the scheduling entity 704 because, for example: the scheduled entity 718 is positioned both behind the blockage 716 and outside of the coverage area 705 (as shown in FIG. 7); the scheduled entity 718 is positioned inside the coverage area

705, but behind the blockage 716; or the scheduled entity 718 is positioned outside of the coverage area 705, but not behind the blockage 716. To provide the scheduled entity 718 access to the scheduling entity 704, the surface controller 722 may configure the antenna elements 720 to redirect the (impinging) second beam 712 as a redirected beam 726 towards the scheduled entity 718. Additionally, the controllable reflective surface 702 may provide bidirectional redirection such that the scheduled entity 718 may transmit an uplink signal or beam towards the controllable reflective surface 702, which is then redirected by the antenna elements 720 as a redirected uplink signal or beam towards the scheduling entity 704.

In some examples, the scheduling entity 704 provides control signals to the controllable reflective surface 702 to control the antenna elements 720. For example, the scheduling entity 704 may communicate the control signals via a wired or wireless connection to a transceiver of the surface controller 722. The control signals may indicate a configuration for the antenna elements 720, also referred to as a directional configuration. In response to the control signals, the surface controller 722 may configure the antenna elements 720 according to the indicated directional configuration.

In some examples, the scheduling entity 704 may perform a beam sweep that includes transmitting a plurality of directional beams, each directional beam transmitted in a particular direction. In response, the scheduling entity 704 may receive feedback from the scheduled entity 718 indicating a directional configuration of the controllable reflective surface 702 that enabled the scheduled entity 718 to receive a particular directional beam of the beam sweep. For example, the scheduled entity 718 may transmit an uplink signal or beam to the scheduling entity 704 (e.g., via the controllable reflective surface 702) that identifies a particular directional beam that was received by the scheduled entity 718 (e.g., the strongest of one or more directional beams that the scheduled entity 718 received). The uplink signal or beam may identify the particular directional beam via an included identifier or by the time at which the uplink signal or beam is transmitted. For example, each directional beam may be associated with a different random access channel (RACH) occasion. Each RACH occasion may be a different, non-overlapping time-frequency resource dedicated to a response RACH message from the scheduled entity 718. Accordingly, by transmitting the uplink signal or beam using a particular time-frequency resource associated with a particular directional beam, the scheduled entity 718 is able to identify the particular directional beam to the scheduling entity 704.

In the event that the scheduling entity 704 performs a beam sweep in the presence of the controllable reflective surface 702, the scheduling entity 704 may transmit multiple distinct directional beams (each associated with a different RACH occasion) towards the controllable reflective surface 702, as well as in other directions. Further, the scheduling entity 704 may be aware of the particular directional configuration of the controllable reflective surface 702 for each of the directional beams transmitted towards the controllable reflective surface 702. Again, by transmitting the uplink signal or beam using a particular time-frequency resource associated with a particular directional beam, the scheduled entity 718 is able to identify the particular directional beam to the scheduling entity 704. Further, the scheduling entity 704 may associate the identified directional beam with a particular directional configuration of the controllable reflective surface 702, for example, based on the known association of the particular directional beam and the directional configuration of the controllable reflective surface 702. The scheduling entity 704 may then, based on the feedback, send control signals to the controllable reflective surface 702 to configure the controllable reflective surface 702 in accordance with the indicated directional configuration.

Additionally, in some examples, the controllable reflective surface 702 may operate in full-duplex mode. That is, in some examples, the controllable reflective surface 702 may support simultaneous two-way communications via the same set of resources. In other examples, the controllable reflective surface 702 may also operate in half-duplex FDD and/or half-duplex TDD.

When enabled to redirect, the controllable reflective surface 702 may redirect signals and beams that impinge the panel 719 and were transmitted by unassociated devices. That is, the controllable reflective surface 702 may not actively discriminate which signals or beams it redirects. Thus, signals or beams from devices (e.g., other base stations or UEs) that impinge the panel 719 may also be redirected by the controllable reflective surface 702. These other base stations or UEs may be unaware of the presence of the controllable reflective surface 702 and/or its particular directional configuration at a given time. Thus, from the perspective of these other base stations or UEs, such redirections may be arbitrary and unpredictable.

Co-Located Scheduling Entities

A communication system, such as the communication systems 100 of FIG. 1 and 700 of FIG. 7, may be associated with a particular network operator. For example, with reference to FIG. 7, the network operator may be a business organization that performs administrative functions related to the system 700, such as establishing a radio access network (RAN) including scheduling entities (e.g., base stations), like the scheduling entity 704, and connecting the RAN to a core network via a backhaul. The network operator may also provide (e.g., sell or lease) scheduled entities (e.g., UEs), like scheduled entities 706 and 718, to users or subscribers. The network operator may regulate the ability of the UEs and other scheduled entities to access the base stations and other scheduling entities (e.g., based on payment of fees by an associated subscriber). In some examples, a first network operator may limit access to a RAN (and its scheduling entities) only to UEs associated with the first network operator, such that UEs associated with a second network operator are not permitted access to the RAN and scheduling entities of the first network operator.

Nevertheless, in some examples, multiple network operators (herein, operators) having respective scheduling entities share a site. In other words, the scheduling entities of the multiple operators are co-located at a site. Such shared sites may include scheduling entities sharing physical resources, such as, for example, one or more physical structures (e.g., a building) that houses hardware of the scheduling entities, one or more power supplies that power the scheduling entities, a tower that supports antennas and/or other hardware that are employed by the scheduling entities, one or more antennas (e.g., shared using time division or frequency division multiplexing), a processing system (e.g., the processing system 514 of FIG. 5), a transceiver (e.g., the transceiver 510 of FIG. 5), a combination thereof, or other components. Each operator is associated with one or more scheduled entities that are configured to access and communicate with the scheduling entity of the particular associated operator. Generally, the scheduled entities associated with one operator are not configured to access the scheduling entity of the other operator(s) at the shared site, although this need not necessarily be the case.

FIGS. 8A and 8B illustrate systems including multiple operators having respective scheduling entities sharing sites. More particularly, FIG. 8A illustrates a communication system 800 having a first shared site 801 including a first scheduling entity 802 for a first operator (Operator B), also referred to as the B$_1$ base station 802, and a second scheduling entity 804 for a second operator (Operator A), also referred to as the A$_1$ base station 804. The B$_1$ and A$_1$ base stations 802 and 804 are co-located at the first shared site 801 and, as described above, may share at least some physical resources. Additionally, the Brand A$_1$ base stations 802 and 804 include at least some unshared, or dedicated, resources. In some examples, the B$_1$ and A$_1$ base stations 802 and 804 may each take the form of a separate instance of the scheduling entity 500 of FIG. 5 and may be fixed on a shared tower of the first shared site 801 (e.g., circle of the site 801 may represent the shared tower). Similarly, FIG. 8A illustrates a second shared site 810 including a third scheduling entity 812 for the first operator (Operator B), also referred to as the B$_2$ base station 812, and a fourth scheduling entity 814 for the second operator (Operator A), also referred to as the A$_2$ base station 814. The B$_2$ and A$_2$ base stations 812 and 814 are co-located at the second shared site 810 and, as described above, may share at least some physical resources. Additionally, the B$_2$ and A$_2$ base stations 812 and 814 include at least some unshared, or dedicated, resources. In some examples, the B$_2$ and A$_2$ base stations 812 and 814 may each take the form of a separate instance of the scheduling entity 500 of FIG. 5 and may be fixed on a shared tower of the first shared site 810.

FIG. 8A further illustrates a first scheduled entity 822 associated with the first operator (Operator B), also referred to as the UE-B 822, and a second scheduled entity 824 associated with the second operator (Operator A), also referred to as the UE-A 824. Generally (e.g., assuming no blockages and sufficient signal strength), because of these UE-to-operator associations, the UE-B 822 is configured to access the B$_1$ and B$_2$ base stations 802 and 812 of Operator B, and the UE-A 824 is configured to access the A$_1$ and A$_2$ base stations 804 and 814 of Operator A.

For a UE, such as the UEs 822 and 824, to gain access to an associated base station, an access routine may be executed. For example, the base stations 802, 804, 812, and 814 may each be configured to perform a beam sweep of one or more directional beams. A beam sweep may include one of the base stations transmitting a plurality of directional beams, one at a time, each in a particular direction. The directional beams, also referred to as beam occurrences, may be transmitted in particular spatial directions by using the beamforming techniques described with respect to FIG. 3. In some examples, one or more of the directional beams are transmitted in different directions, while one or more of the directional beams may transmitted in a same or similar direction. For example, multiple distinct directional beams of a beam sweep may be transmitted in the particular direction of a controllable reflective panel (e.g., similar to the controllable reflective surface 702). As described further below, each directional beams includes signals or information (i.e., beam data) that, upon receipt and interpretation by the UE, allows the UE to further communicate with (i.e., access) the base station that transmitted the received directional beam. The further communications may include one or both of downlink communications and uplink communications.

In FIG. 8A, a blockage 830 is present between the first site 801 and the UEs 822 and 824 that blocks communications from the B and $A_1$ base stations 802 and 804 from reaching the UEs 822 and 824, respectively. Accordingly, directional beams transmitted as part of a beam sweep in an access routine of the $B_1$ and $A_1$ base stations 802 and 804 may not reach the UEs 822 and 824. Thus, because of the blockage 830, the UEs 822 and 824 cannot access the $B_1$ and $A_1$ base stations 802 and 804. Although the blockage 830 prevents the UEs 822 and 824 from accessing $B_1$ and $A_1$ base stations 802 and 804, respectively, the UEs 822 and 824 can access the $B_2$ and $A_2$ base stations 812 and 814, respectively.

Although FIG. 8A illustrates a blockage 830 that prevents access, in some examples, the UEs 822 and 824 cannot access the $B_1$ and $A_1$ base stations 802 and 804, respectively, because the UEs 822 and 824 are too far away from the $B_1$ and $A_1$ base stations 802 and 804.

FIG. 8B illustrates a similar arrangement of several of the components of FIG. 8A. Accordingly, the description with respect to elements in FIG. 8A, including the shared sites, scheduling entities (e.g., base stations), scheduled entities (e.g., UEs), and blockage, also applies to the like-numbered elements in FIG. 8B. The communication system 800 of FIG. 8B further includes a controllable reflective surface 850 that is associated with the first operator (Operator B). The controllable reflective surface 850 may be similar to the controllable reflective surface 702 described with respect to FIG. 7, and may be controlled by the first operator (e.g., by Operator B via the $B_1$ base station 802) in a similar manner as the scheduling entity 704 controls the controllable reflective surface 702.

The controllable reflective surface 850 is configured to redirect signals to/from the $B_1$ base station 802 (of Operator B) from/to the UE-B 822 (of Operator B), around the blockage 830 and/or to a location beyond the direct reach of the $B_1$ base station 802 or UE-B 822. Additionally, because the controllable reflective surface 850 may not actively discriminate which signals it redirects, when enabled, the controllable reflective surface 850 may also redirect signals it receives from the $A_1$ base station 804 (of the non-associated operator, Operator A). At the point of reception by the UE-A 824, the power level or signal strength of a reflected directional beam from the $A_1$ base station 804 may be greater than that of a directional beam from the $A_2$ base station 814. Accordingly, in some instances, the UE-A 824 (a subscriber of Operator A) may inadvertently access the $A_1$ base station 804 through the controllable reflective surface 850, rather than directly access the $A_2$ base station 814. The controllable reflective surface 850, however, is not under the control of the $A_1$ base station 804 (of Operator A). Accordingly, from the perspective of the $A_1$ base station 804, the controllable reflective surface 850 may be reconfigured at unexpected times (e.g., at any suitable time determined by Operator B). Such reconfiguring of the controllable reflective surface 850 by Operator B may cause the UE-A 824 to unexpectedly lose access to the $A_1$ base station 804. For example, the reconfiguring of the controllable reflective surface 850 by Operator B may cause the controllable reflective surface 850 to redirect signals in a different direction (e.g., away from the UE-A 824). Thus, the beams or signals to be communicated to/from the $A_1$ base station 804 from/to the UE-A 824 may no longer reach the intended recipient (i.e., the $A_1$ base station 804 or the UE-A 824, as the case may be), or may reach the intended recipient at significantly lower power levels such that the recipient is not able to interpret the beam or signal.

In the scenario illustrated in FIG. 8B, at the point of reception by the UEs 822 and 824 of the signals from the base stations 802, 804, 812, and 814, the signals from the $B_1$ and $A_1$ base stations 802 and 804 (at the first site 801) are stronger than the signals from the $B_2$ and $A_2$ base stations 812 and 814. The stronger signals may be attributable to one or more factors, such as, for example, a redirection of signals from those base stations towards the UEs by the controllable reflective surface 850, a closer proximity of the first site 801 to the UEs 822 and 824 than the second site 810, or a higher transmission power by the $B_1$ and $A_1$ base stations 802 and 804 than the $B_2$ and $A_2$ base stations 812 and 814.

Accordingly, the UE-B 822 (again, a subscriber to Operator B) may receive respective directional beams from both the $B_1$ and $B_2$ base stations 802 and 812 during access procedures. The UE-B 822 may then select and access the $B_1$ base station 802 because of its stronger (e.g., reflected) signal strength. Similarly, from the perspective of the UE-A 824 (e.g., a subscriber of Operator A), when the controllable reflective surface 850 happens to be configured in such a way that it redirects signals from the $A_1$ base station 804, the UE-A 824 may receive respective directional beams from both the $A_1$ and $A_2$ base stations 804 and 814 during access procedures of the $A_1$ and $A_2$ base stations 804 and 814. The UE-A 824 may then select and access the $A_1$ base station 804 because of its stronger (e.g., reflected) signal strength. However, as noted, the controllable reflective surface 850 is not under the control of the $A_1$ base station 804 (of Operator A). Accordingly, from the perspective of the $A_1$ base station 804 and the UE-A 824, the controllable reflective surface 850 may be reconfigured unexpectedly. As described above, such reconfiguration of the controllable reflective surface 850 may cause UE-A 824 to unexpectedly lose access to the $A_1$ base station 804.

As described in further detail below, in some examples, the $B_1$ base stations 802 may modify the relative timing of the beam sweeps of the co-located $B_1$ and $A_1$ base stations 802 and 804 to mitigate or avoid this issue.

In scenarios in which the $B_1$ and $A_1$ base stations 802 and 804 at the first shared site 801 perform access procedures at a same or overlapping time period, the likelihood of the UE-A 824 accessing the $A_1$ base station 804 via the controllable reflective surface 850 and unexpectedly losing access due to a reconfiguration of the controllable reflective surface 850 may increase. For example, the base stations 802 and 804 may perform recurrent or periodic beam sweeps as part of their respective access procedures during a same or overlapping time period. During the beam sweep by the $A_1$ base station 804, the controllable reflective surface 850 (which is in a first directional configuration) may redirect directional beams to the UE-A 824. In response, the UE-A 824 may select and access the $A_1$ base station 804. However, the first directional configuration of the controllable reflective surface 850 may have been one momentary configuration in a cycle of a plurality of directional configurations used during a beam sweep by the $B_1$ base station 802. Further, based on the beam sweep by the $B_1$ base station 802, the UE-B 822 (or another UE) may provide feedback to the $B_1$ base station 802 indicating a different one of the plurality of directional configurations for the controllable reflective surface 850. As a result, the $B_1$ base station 802 may change the directional configuration of the controllable reflective surface 850 to this different (second) directional configuration, which may cause the controllable reflective surface 850 to no longer redirect signals from the $A_1$ base station 804 to the UE-A 824. Thus, shortly after the UE-A 824 may select and access the $A_1$ base station 804 via the controllable reflective surface 850, the controllable reflective surface 850 may be reconfigured by the B₁ base station 802 and cause the UE-A 824 to lose access to the A₁ base station 804. The UE-A 824 will again try to gain access in another access procedure, but the base stations 802 and 804 may again perform their access procedures at a same or overlapping time period. Thus, the same temporary connection with the A₁ base station 804 may form with and be lost by the UE-A 824. Accordingly, rather than establishing a stable connection with the A₂ base station 814 at the second site 810, the UE-A 824 may obtain unstable or temporary access with the A₁ base station 804 one or more times.

Some examples described herein reduce the likelihood that such unstable access to a base station is provided by an inadvertent redirection of a directional beam, from the base station, by a controllable reflective surface under the control of another base station (e.g., one at a shared site with or co-located with the base station). Accordingly, some examples described herein can improve the stability of access between a UE and a base station.

FIG. 9 is a flow chart illustrating an exemplary process 900 for wireless communication in accordance with some aspects of the present disclosure. As described below, a particular implementation may omit some or all illustrated features, and may not require some illustrated features to implement all embodiments. In some examples, the scheduling entity 500 illustrated in FIG. 5 may be configured to carry out the process 900. For illustration purposes, the process 900 is described with respect to communication systems 1000, 1200, and 1400 illustrated in FIGS. 10A-10B, 12A-12B, 12D, and 14A-C, respectively, and components therein, including scheduling entities (e.g., base stations) 1002, 1004, 1012, 1014, 1202, 1204, 1212, 1214, 1412, and 1414 each of which may be an example of the scheduling entity 500 illustrated in FIG. 5. In some examples, any suitable apparatus or means for carrying out the functions or algorithm described below may carry out the process 900.

At block 905, a first scheduling entity that is co-located at a site with a second scheduling entity performs a first beam sweep. The first beam sweep includes the first scheduling entity transmitting a plurality of directional beams. An example of such a first beam sweep is provided with respect to FIG. 10A, which, along with FIG. 10B, illustrates a communication system 1000 that includes similar components as the communication system 800 of FIG. 8B. Except for any differences noted herein, the description of provided with respect to the system 800 applies to the system 1000. Components of the system 1000 that are similar to the components of system 800 have the same element number plus 200 (e.g., the B₁ base station 1002 is similar to the B₁ base station 802).

In this example, in block 905, the B₁ base station 1002 that is co-located at the site 1001 with the A₁ base station 1004 performs a first beam sweep 1055. The first beam sweep 1055 includes the B₁ base station 1002 transmitting a plurality of directional beams 1060, each directional beam transmitted in a particular direction. The B₁ base station 1002 may transmit the directional beams in different spatial directions by using its transceiver to control antennas using the beam forming techniques described with respect to FIG. 3. In the illustrated example, the beam sweep 1055 includes four directional beams 1060, labeled B1, B2, B3, and B4. The directional beam B4 is directed toward the controllable reflective surface 1050 and along path 1065. In some examples, the beam sweep 1055 includes more or fewer directional beams, such as eight or sixty-four directional beams.

The UE (e.g., the UE-B 1022) can receive and interpret a directional beam from a beam sweep (e.g., the beam sweep 1055) to establish access with the scheduling entity (e.g., the B1 base station 1002). For example, the directional beam may include signals or information (referred to as beam data) that may be received and interpreted by a UE (e.g., the UE-B 1022). The beam data may include one or more reference signals, one or more synchronization signals, and/or an identifier for the particular directional beam. In some examples, a UE (e.g., the UE-B 1022) may be able to receive and interpret the beam data to synchronize with a downlink (DL) channel of the B₁ base station 1002 and to enable the UE to initiate a random access request procedure to synchronize with an uplink (UL) channel. In some examples, the beam data of a directional beam may include a synchronization signal block (SSB) that includes the above-described primary synchronization signal (PSS), a secondary synchronization signal (SSS), a master information block (MIB), and a demodulation reference signal (DM-RS). In some examples, as part of a random access request procedure initiated by the UE after receiving a directional beam or as part of another uplink communication, the UE provides to the base station an indication of the particular directional beam that the UE received. For example, the particular directional beam may have an identifier included in its beam data and the UE may transmit a random access request message including this identifier. In the case of the UE receiving multiple directional beams from the base station, the UE may provide an indication of the particular directional beam associated with the strongest (or otherwise desired) directional beam. In response, the base station 1002 may allocate narrow band and/or beam-formed (directional) downlink resources and/or uplink resources for future communications between the UE-B 1022 and the B₁ base station 1002.

Returning to the process 900 of FIG. 9, at block 910, the first base station (e.g., the B₁ base station 1002) transmits a control signal to a controllable reflective surface. The control signal, which may include one or more signals, controls the controllable reflective surface to reduce a likelihood of a reflection, by the controllable reflective surface, of a directional beam of a potential second beam sweep by the second base station (e.g., the A₁ base station 1004) towards a UE associated with the second base station (e.g., UE-A 1024). For example, with reference to FIG. 10B, the B₁ base station 1002 transmits a control signal 1067 to the controllable reflective surface 1050. The control signal 1067 controls the controllable reflective surface 1050 to reduce a likelihood of a redirection, by the controllable reflective surface 1050, of a directional beam of a potential second beam sweep by the A₁ base station 1004 towards the UE-A 1024 associated with the A₁ base station 1004. The descriptor "potential" is used in the name "potential second beam sweep" because whether and/or when the second beam sweep by the A₁ base station 1004 occurs may not be definitively known by the B1 base station 1002. For example, the B₁ base station 1002 may take action (e.g., transmit the control signal 1067) based on an expectation or possibility that the second beam sweep by the A₁ base station 1004 will or might occur, but the second beam sweep may not actually occur for various reasons, and the B₁ base station 1002 may not be aware of whether the second beam sweep by the A₁ base station 1004 actually occurs.

As explained further below, the control signal 1067 may control the controllable reflective surface 1050 to reduce a likelihood of such a redirection using various techniques, including control techniques based on the use of asynchronous beam sweeps as described with respect to FIGS. 11-12D and/or control techniques based on the use of joint beam sweeps as described with respect to FIGS. 13-14C.

Turning to FIG. 11, an asynchronous beam sweep process 1100 is illustrated that may be used to implement blocks 905 and 910 of FIG. 9B, in accordance with some aspects of the present disclosure. As described below, a particular implementation may omit some or all illustrated features, and may not require some illustrated features to implement all embodiments. In some examples, the scheduling entity 500 illustrated in FIG. 5 may be configured to carry out the process 1100. For illustration purposes, the process 1100 is described with respect to communication system 1200 illustrated in FIGS. 12A, 12B, and 12D, and components therein, including base stations 1202, 1204, 1212, and 1214, each of which may be an example of the scheduling entity 500 illustrated in FIG. 5. In some examples, any suitable apparatus or means for carrying out the functions or algorithm described below may carry out the process 1100.

In block 1105, the first scheduling entity (e.g., the $B_1$ base station 1202) performs the first beam sweep (i.e., the first beam sweep noted in block 905 of FIG. 9) asynchronously with respect to the potential second beam sweep by the second scheduling entity (e.g., the $A_1$ the base station 1204). In some examples, to execute block 1105, the first scheduling entity (e.g., the $B_1$ base station 1202) determines an expected time period for the potential second beam sweep of the second scheduling entity (e.g., the $A_1$ the base station 1204) (block 1110). The first scheduling entity (e.g., the $B_1$ base station 1202) then performs the first beam sweep during a time period other than the expected time period for the potential second beam sweep, such as a preceding time period (block 1015).

Figure 12A:
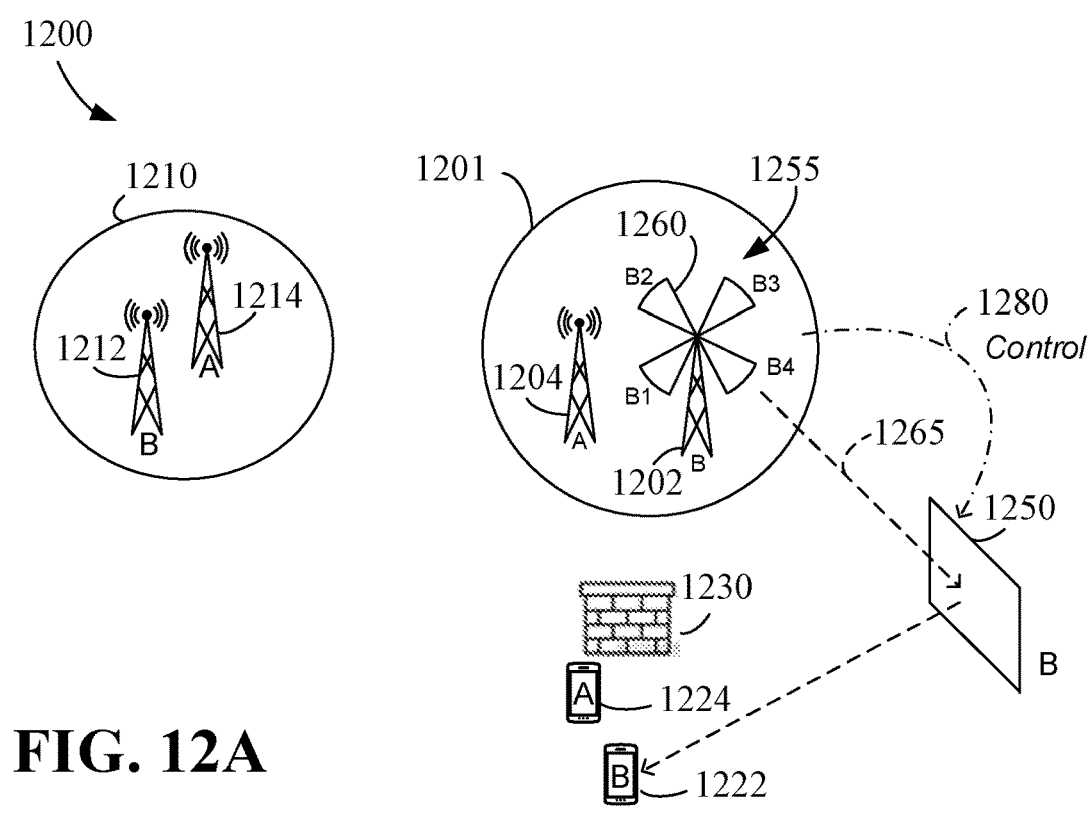
FIGS. 12A-B are diagrams illustrating a wireless communication system having a shared site with multiple scheduling entities according to some embodiments.
Figure 12B:
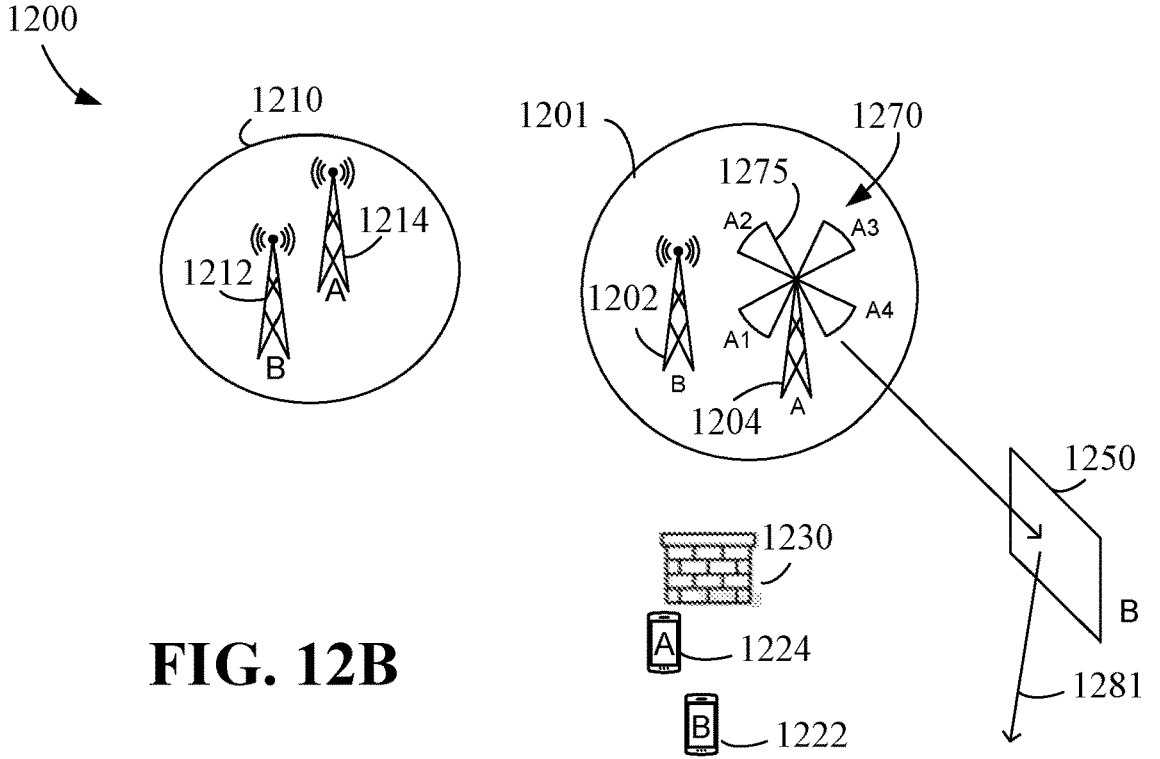
Figure 12C:
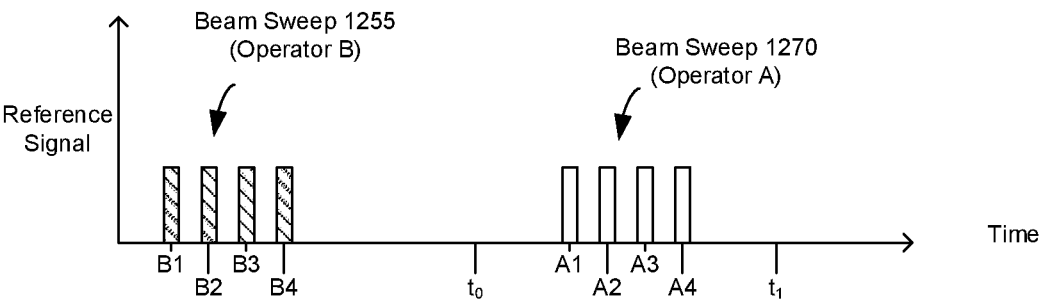
FIG. 12C is a timing diagram illustrating an example of asynchronous beam sweeps according to some embodiments.

An example of such a first beam sweep that is asynchronous with respect to a potential second beam sweep is provided with respect to FIGS. 12A-C. FIGS. 12A, 12B, and 12D illustrate a communication system 1200 that includes similar components as the communication system 1000 of FIGS. 10A-B. Except for any differences noted herein, the description provided with respect to the system 1000 applies to the system 1200. Components of the system 1200 that are similar to the components of system 1000 have the same element number plus 200 (e.g., the $B_1$ base station 1202 is similar to the $B_1$ base station 1002).

For example, to execute block 1105, the $B_1$ base station 1202 may determine an expected time period for the potential second beam sweep of the $A_1$ base station 1204. The $B_1$ base station 1202 may communicate, via a wired or wireless connection, with the $A_1$ base station 1204 to determine the expected time period for the potential second beam sweep. For example, the $B_1$ base station 1202 may send a request to the $A_1$ base station 1204, and the A base station 1204 may respond with an indication of the time period during which the $A_1$ base station 1204 expects to perform a beam sweep. The $B_1$ base station 1202 then performs the first beam sweep during a time period other than the expected time period for the potential second beam sweep (e.g., a preceding time period). For example, with reference to FIG. 12A, the $B_1$ base station 1202 performs the first beam sweep 1255. With reference to FIG. 12B, at a later point in time (e.g., during the expected time period and after completion of the first beam sweep 1255), the $A_1$ base station 1204 performs a second beam sweep 1270 including second directional beams 1275. Thus, the time periods of the first and second beam sweeps 1255, 1270 do not overlap with one another. The second beam sweep 1270 includes the $A_1$ base station 1204 transmitting a plurality of directional beams 1275, each directional beam transmitted in a particular direction. In the illustrated example, the beam sweep 1270 includes four directional beams 1275, labeled A1, A2, A3, and A4. In some examples, the beam sweep 1270 includes more or fewer directional beams 1275.

FIG. 12C illustrates a timing diagram of these asynchronous beam sweeps, with the first beam sweep 1255 occurring during a time period that precedes the second beam sweep 1270. Beam sweeps are considered asynchronous beam sweeps when they occur at different, non-overlapping times, such as shown in FIG. 12C.

Returning to FIG. 11, in block 1120, the first scheduling entity maintains the controllable reflective surface in a directional configuration during an expected time period for the potential second beam sweep by the second scheduling entity. In some examples, the first scheduling entity executes the block 1120 to implement block 910 of FIG. 9, in which the first scheduling entity transmits control signals to the controllable reflective surface.

For example, with reference to FIG. 12B, the $B_1$ base station 1202 maintains the controllable reflective surface 1250 in a directional configuration during an expected time period for the second beam sweep 1270 by the $A_1$ base station 1204. For example, with reference to FIG. 12B and the timing diagram of FIG. 12C, the $B_1$ base station 1202 may maintain the controllable reflective surface 1250 in the directional configuration during the expected time period for the second beam sweep 1270 between time points to and $t_1$. To maintain the controllable reflective surface 1250 in the directional configuration, the $B_1$ base station 1202 may send control signals 1280 to configure the controllable reflective surface 1250 into the directional configuration at or before time $t_0$ and then delay sending further control signals that reconfigure the controllable reflective surface 1250 until at least after time $t_1$.

In some examples, the directional configuration in which the controllable reflective surface 1250 is maintained (in block 1120) is a disabled directional configuration. In the disabled directional configuration, the antenna elements of the controllable reflective surface 1250 may be configured to absorb impinging signals, such as signals transmitted by the $A_1$ base station 1204 as part of the beam sweep 1270 that are directed toward the controllable reflective surface 1250.

In some examples, the directional configuration in which the controllable reflective surface 1250 is maintained (in block 1120) is a stable directional configuration. In a stable directional configuration, the antenna elements of the controllable reflective surface 1250 are configured to redirect an impinging signal in a particular direction, and that direction does not change until the directional configuration of the controllable reflective surface 1250 is changed. For example, in FIG. 12B, the controllable reflective surface 1250 redirects the (A4) directional beam 1275 in a direction 1281 that is not toward the UE-A 1224. Thus, for example, when the controllable reflective surface 1250 is in a stable directional configuration, the controllable reflective surface 1250 is not being controlled to cycle between a plurality of directional configurations that each redirect impinging signals in different directions. When the controllable reflective surface 1250 is maintained in a stable directional configuration, selected from a plurality of potential directional configurations, the likelihood that the particular stable directional configuration will redirect an impinging signal from the $A_1$ base station 1204 (e.g., a directional beam as part of an access procedure) towards the UE-A 1224 is lower than if the controllable reflective surface 1250 was cycling through multiple directional configurations. For example, if the controllable reflective surface 1250 was cycling through multiple directional configurations while the (A4) directional beam 1275 from the second beam sweep 1270 is directed toward the controllable reflective surface 1250, the (A4) directional beam 1275 may be redirected in a plurality of different directions while the (A4) directional beam 1275 is being transmitted, increasing the likelihood that one of the different directions is aimed toward the UE-A 1224.

In some examples, the directional configuration in which the controllable reflective surface 1250 is maintained (in block 1120) is based on feedback that the $B_1$ base station 1202 receives from the UE-B 1222 in response to the first beam sweep 1255. For example, in response to the beam sweep 1255, the UE-B 1222 may receive a directional beam (e.g., directional beam B4 along path 1265 redirected by the controllable reflective surface 1250). The UE-B 1222 may reply with feedback to the $B_1$ base station 1202 indicating a particular directional beam associated with a particular directional configuration of the controllable reflective surface 1250 (e.g., that resulted in the strongest directional beam received by the UE-B 1222). In turn, the $B_1$ base station 1202 may configure the controllable reflective surface 1250 in the indicated directional configuration (from among a plurality of available directional configurations) such that future transmitted signals directed toward the controllable reflective surface 1250 from the $B_1$ base station 1202 are redirected by the controllable reflective surface 1250 toward the UE-B 1222, and future transmitted signals directed toward the controllable reflective surface 1250 from the UE-B 1222 are redirected by the controllable reflective surface 1250 toward the $B_1$ base station 1202. In other words, the $B_1$ base station 1202 may configure the controllable reflective surface 1250 into the directional configuration to enable the UE-B 1222 access to the $B_1$ base station 1202.

Figure 12D:
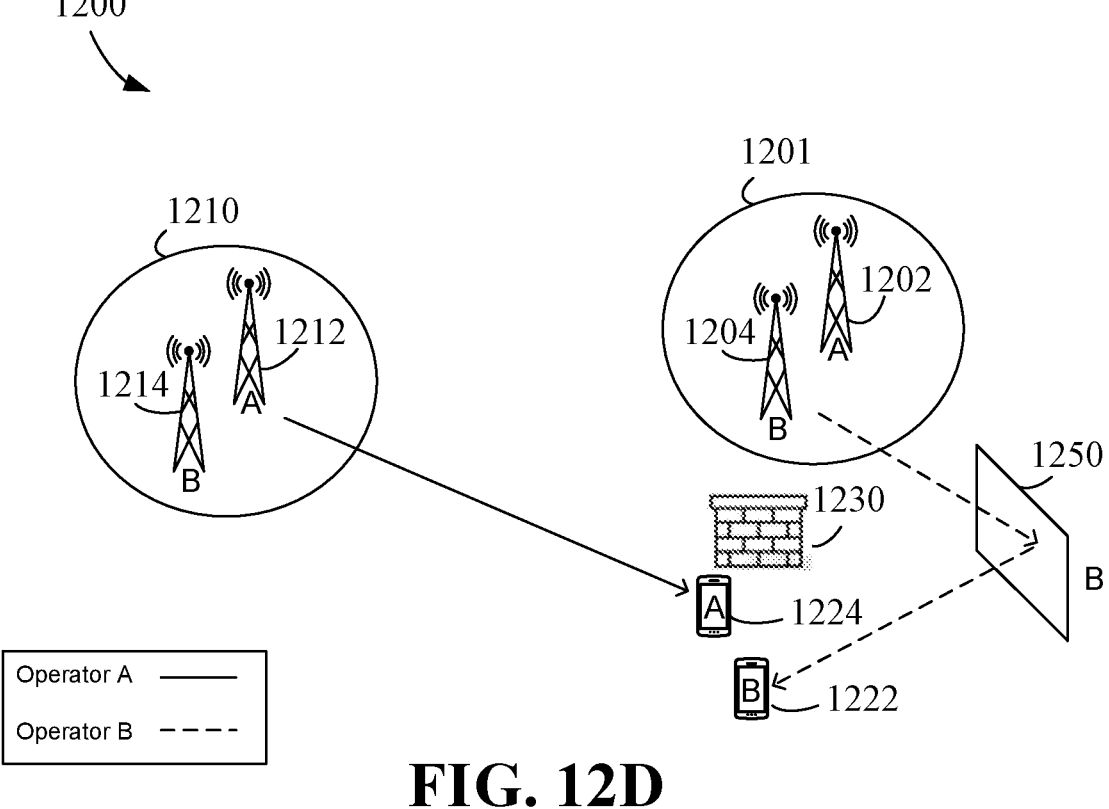
FIG. 12D is a diagram illustrating a wireless communication system having a shared site with multiple scheduling entities according to some embodiments.

FIG. 12D illustrates an example of access for the UEs 1222 and 1224 that may result from the process 900 and from the process 1100. More particularly, the UE-B 1222 is accessing the $B_1$ base station 1202 (indirectly) via the controllable reflective surface 1250, and the UE-A 1224 is accessing the $A_1$ base station 1204 (directly).

Figure 13:
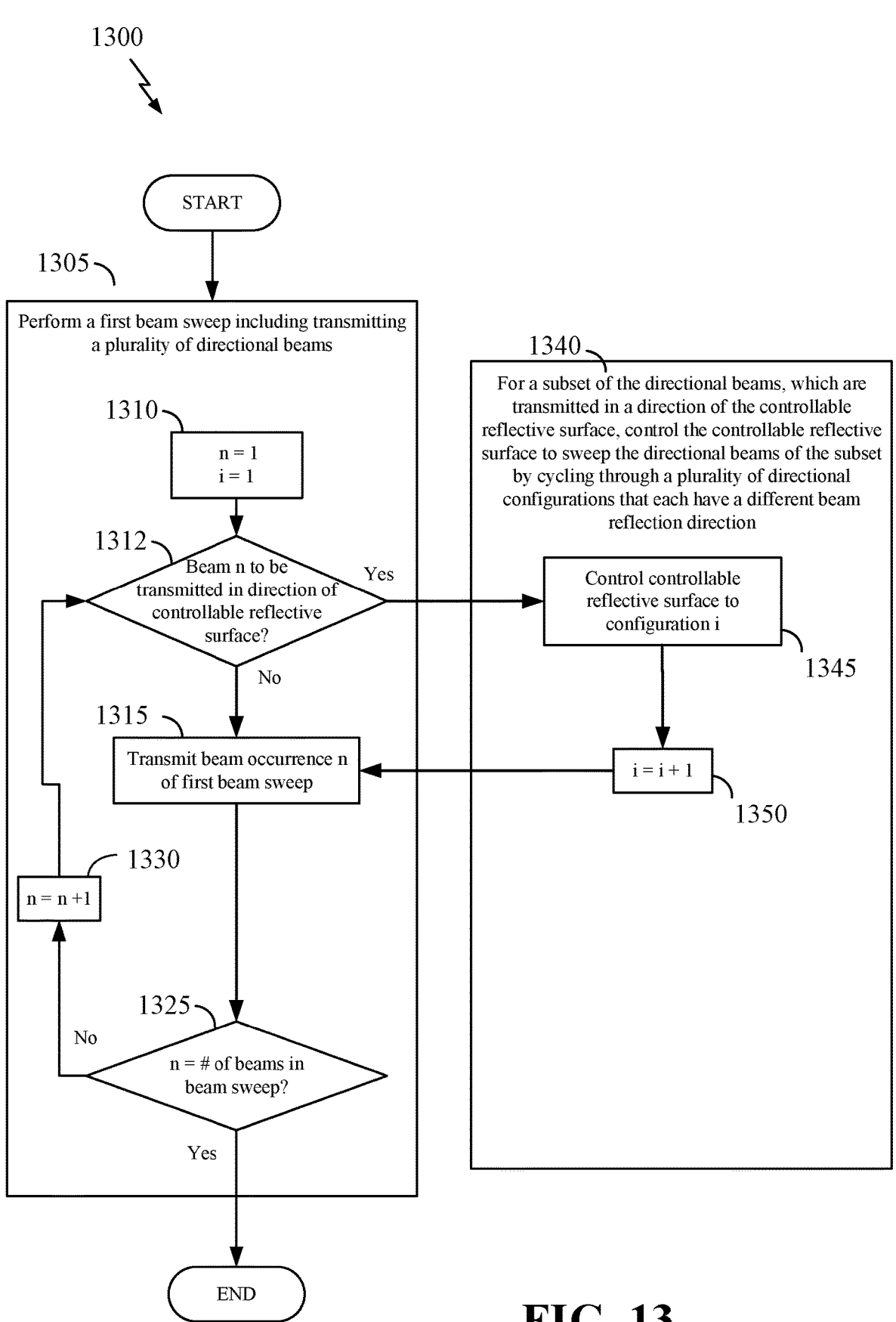
FIG. 13 is a flow chart illustrating an exemplary process for joint beam sweeping according to some embodiments.

Turning to FIG. 13, a joint beam sweep process 1300 is illustrated that may be used to implement blocks 905 and 910 of FIG. 9, in accordance with some further aspects of the present disclosure. As described below, a particular implementation may omit some or all illustrated features, and may not require some illustrated features to implement all embodiments. In some examples, the scheduling entity 500 illustrated in FIG. 5 may be configured to carry out the process 1300. For illustration purposes, the process 1300 is described with respect to communication system 1400 illustrated in FIG. 14A-C, respectively, and components therein, including base stations 1402 and 1404, each of which may be an example of the scheduling entity 500 illustrated in FIG. 5. In some examples, any suitable apparatus or means for carrying out the functions or algorithm described below may carry out the process 1300.

Figure 14A:
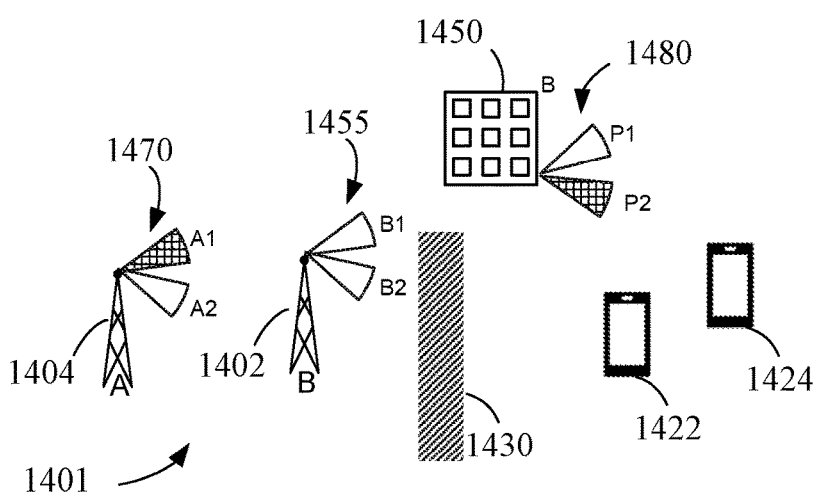
FIG. 14A is a diagram illustrating a wireless communication system having a shared site with multiple scheduling entities according to some embodiments.

In block 1305, the first scheduling entity, which may be co-located at the site with the second scheduling entity, performs the first beam sweep. Performing the first sweep includes the first scheduling entity transmitting a plurality of directional beams. In some examples, the first scheduling entity executing block 1305 is an example of a first scheduling entity executing block 905 of FIG. 9. An example of performing the first beam sweep of block 1305 is provided with respect to FIG. 14A. FIG. 14A illustrates a communication system 1400 that includes similar components as the communication system 1000 of FIGS. 10A-B. Except for any differences noted herein, the description provided with respect to the system 1000 applies to the system 1400. Components of the system 1400 that are similar to the components of the system 1000 have the same element number plus 400 (e.g., the $B_1$ base station 1402 is similar to the $B_1$ base station 1002). To simplify the discussion, FIG. 14A does not illustrate a second site similar to site 1010 of FIG. 10; however, such a second site with further co-located base stations is present in some examples of the communication system 1400.

In some examples, the $B_1$ base station 1402 of FIG. 14A executes block 1305 of FIG. 13 to perform the first beam sweep. For example, the $B_1$ base station 1402 may set a variable n=1 and a variable i=1 (block 1310). In block 1312, the $B_1$ base station 1402 determines whether the directional beam n of the first beam sweep 1455 is in the direction of a controllable reflective surface (e.g., towards the controllable reflective surface 1450). The $B_1$ base station 1402 may have a priori knowledge (e.g., stored in a memory) of which directional beams of the first beam sweep 1455 are to be transmitted in the direction of the controllable reflective surface 1450. In the event that the directional beam n is not to be transmitted towards the controllable reflective surface 1450, in block 1315, the $B_1$ base station 1402 transmits directional beam n of the first beam sweep 1455.

The $B_1$ base station 1402 then determines whether the beam sweep 1455 is complete in block 1325 (i.e., whether n=the total number of directional beams in the beam sweep). When the beam sweep 1455 is complete, the $B_1$ base station 1402 ends the process 1300. When the beam sweep 1455 is not complete, the $B_1$ base station 1402 increments n (i.e., n=n+1) in block 1330, and then returns to block 1312 to determine whether the directional beam n is to be transmitted in the direction of the controllable reflective surface 1450. In block 1312, when the $B_1$ base station 1402 determines that the directional beam n is to be transmitted in the direction of the controllable reflective surface 1450, the $B_1$ base station 1402 proceeds to block 1340.

In block 1340, for a subset of the directional beams, which are transmitted in a direction of the controllable reflective surface, the scheduling entity controls the controllable reflective surface to sweep the directional beams of the subset by cycling through a plurality of directional configurations that each have a different beam reflection direction. In some examples, the first scheduling entity executing block 1340 is an example of a first scheduling entity implementing block 910 of FIG. 9, in which the first scheduling entity transmits control signals to the controllable reflective surface. An example of controlling the controllable reflective surface to sweep in block 1340 is provided with respect to FIG. 14A. More particularly, FIG. 14A illustrates a panel beam sweep 1480 performed by the controllable reflective surface 1450. The panel beam sweep 1480 includes two beam reflection directions, labeled P1 and P2, which respectively correspond to a first and second directional configuration of the controllable reflective surface 1450. Thus, in the panel beam sweep 1480 illustrated in FIG. 14A, the controllable reflective surface 1450 has two directional configurations and associated directional beams. However, in some examples, the panel beam sweep 1480 includes more than two directional configurations and associated directional beams, such as four, eight, sixty-four, or another value.

In some examples, with reference to FIG. 14A, to execute block 1340, the $B_1$ base station 1402 sends control signals to the controllable reflective surface 1450 that configure the controllable reflective surface 1450 to directional configuration i (block 1345). The $B_1$ base station 1402 then increments i (i.e., i=i+1) in block 1350.

The $B_1$ base station 1402 then returns to block 1315 to transmit beam occurrence n. The configured controllable reflective surface 1450, in turn, redirects the directional beam n transmitted by the $B_1$ base station 1402. For example, in the first directional configuration (i=1), the controllable reflective surface 1450 redirects the directional beam n in beam reflection direction P1.

The $B_1$ base station 1402 then determines whether the beam sweep 1455 is complete in block 1325 (i.e., whether n=the total number of directional beams in the beam sweep). When the beam sweep 1455 is complete, the $B_1$ base station 1402 ends the process 1300. When the beam sweep 1455 is not complete, the $B_1$ base station 1402 increments n (i.e., n=n+1) in block 1330, and then returns to block 1312 to determine whether the directional beam n is to be transmitted in the direction of the controllable reflective surface 1450. The $B_1$ base station 1402 may be configured to send multiple consecutive beam occurrences (e.g., beam occurrence n, n+1, n+2, n+3, etc.), one for each directional configuration of the controllable reflective surface 1450 to be included in the panel sweep 1480. After completing the panel sweep 1480, the $B_1$ base station 1402 may continue on with block 1305 to transmit further directional beams in directions other than the direction of the controllable reflective surface 1450, until $B_1$ base station 1402 determines that the beam sweep 1455 is complete (in block 1325).

In some examples, the process 1300 of FIG. 13 is performed by the $B_1$ base station 1402 without knowledge of the timing of the beam sweep 1470 of the $A_1$ base station 1404. Because the $B_1$ base station 1402 is unaware of the timing of the beam sweep 1470 of the $A_1$ base station 1404, the $B_1$ base station 1402 may not be able to knowingly transmit the beam sweep 1455 asynchronously with respect to the beam sweep 1470. However, by sending control signals to the controllable reflective surface 1450 to cause the panel beam sweep 1480 that sweeps consecutive directional beams of the beam sweep 1455 directed towards the controllable reflective surface 1450, the $B_1$ base station 1402 may reduce the likelihood of the controllable reflective surface 1450 redirecting of a directional beam of the beam sweep 1470 towards a UE associated with the $A_1$ base station 1404 (e.g., the UE-A 1424).

For example, in FIG. 14A, the beam sweep 1470 is illustrated as including two directional beams (A1, A2) and the panel beam sweep 1480 is illustrated as having two beam reflection directions (P1, P2). The beam sweep 1455 is illustrated in FIG. 14A with two directional beam transmission directions B1 and B2; however, the beam sweep 1455 actually includes four directional beams B1-1, B1-2, B2-1, and B2-2 where beams B1-1 and B1-2 are in the same direction (the direction of B1 illustrated in FIG. 14A) and beams B2-1 and B2-2 are in the same direction (the direction of B2 illustrated in FIG. 14A). In the example of FIG. 14A, the particular permutation of simultaneous directional beams to avoid to prevent redirecting of a directional beam of the beam sweep 1470 towards the UE-A 1424 is A1 and P2. That is, when the $A_1$ base station 1404 transmits directional beam A1 at the same time as the controllable reflective surface 1450 being configured to redirect impinging beams in the beam reflection direction P2, the UE may inadvertently access the $A_1$ base station 1404 via the controllable reflective surface 1450. As described previously with respect to FIG. 8B, because the controllable reflective surface 1450 is under the control of base station 1402, the access of the UE-A 1424 to the $A_1$ base station 1404 may be interrupted unexpectedly.

Figure 14B:
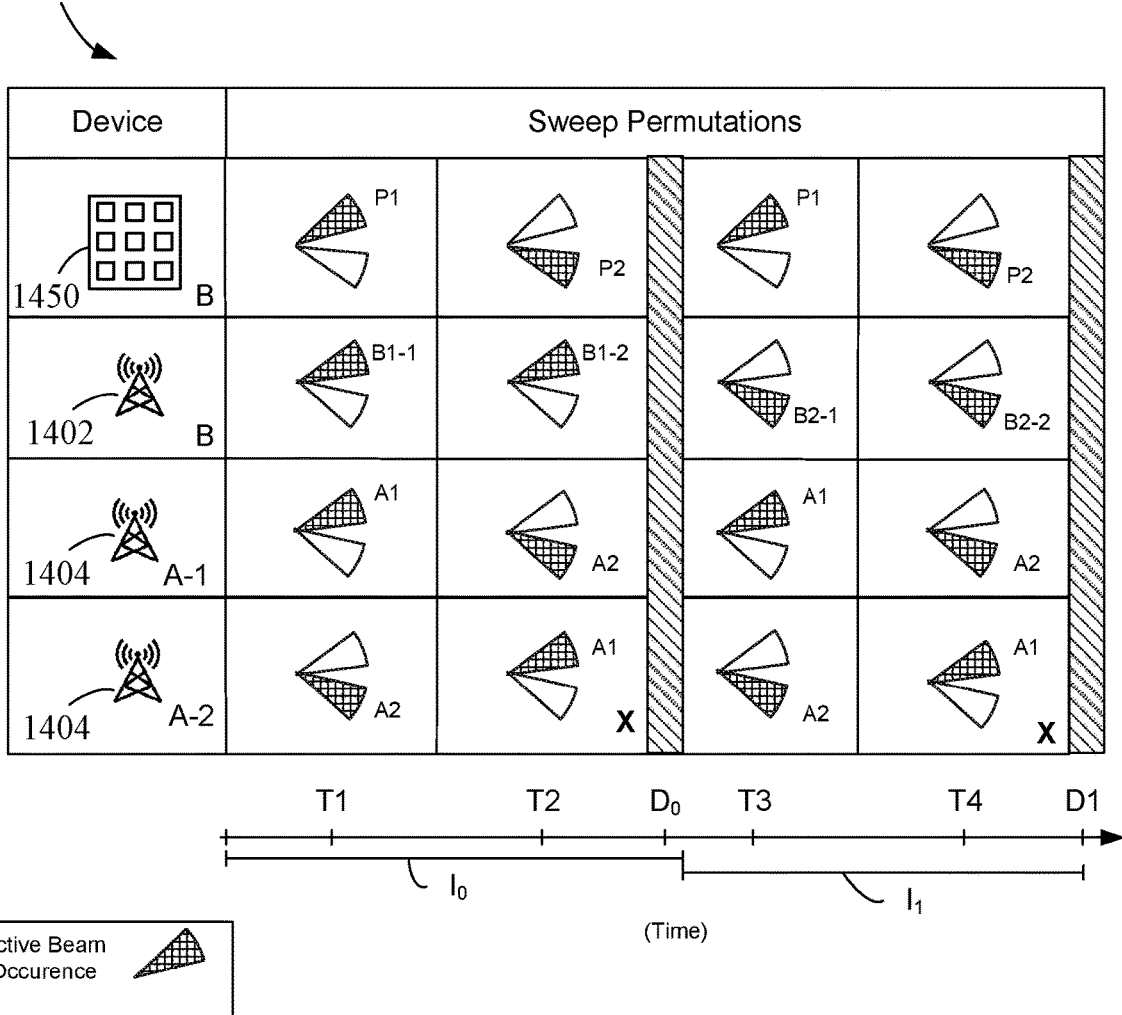
FIGS. 14B-C are tables illustrating example sweep permutations over time for the communication system of FIG. 14A according to some embodiments.

FIG. 14B illustrates a table 1484 of one example of sweep permutations over time that may be possible for the communication system 1400. The first two rows of the table 1484 illustrate the directional beams for the four permutations of the joint (or two-stage) beam sweep of the $B_1$ base station 1402 and the controllable reflective surface 1450 at times T1-T4, respectively, during execution of the process 1300 by the $B_1$ base station 1402. That is, a first permutation occurs during T1 (n=1, i=1; B1-1, P1 directional beams), a second permutation occurs during T2 (n=1, i=2; B1-2, P2 directional beams), a third permutation occurs during T3 (n=2, i=1; B2-1, P1 directional beams), and a fourth permutation occurs during T4 (n=2, i=2; B2-2, P2 directional beams).

In some examples, the joint beam sweep of the $B_1$ base station 1402 and the controllable reflective surface 1450 is divided into segments (or windows) that occur over a segment time period. Each segment may include a subgroup of the total permutations of the joint beam sweep and a delay interval. A new segment may begin after the segment time period of the previous segment (i.e., after the subgroup of total permutations is implemented and the delay interval), such that the new segments begin at a periodic time interval. For example, with reference to FIG. 14B, a first segment occurs over interval $I_0$ and includes the first and second permutations and a delay $D_0$, and the second segment occurs over interval $I_1$ and includes the third and fourth permutations and a delay $D_1$. In some examples, the interval $I_0$ is the same as the interval $I_1$. In some examples, the intervals $I_0$ and $I_0$ are 20 milliseconds (ms), but the duration is shorter or longer in other examples. In the illustrated example, the number of permutations in a segment is two; however, in some examples, the number of permutations in a segment is greater or less than two, and/or may be set to the total number of directional beams of the base station.

The third and fourth rows of the table 1484 illustrate the directional beams for the $A_1$ base station 1404 that may occur in two different scenarios in which the beams sweeps 1455 and 1470 of the $B_1$ and $A_1$ base stations 1402 and 1404 occur synchronously. These examples in table 1484 presume that the beam sweeps 1455 and 1470 have the same number of directional beams per segment (two) and that the beam sweep 1470 and each segment of the joint beam sweep of the $B_1$ base station 1402 and the controllable reflective surface 1450 start at the same time and have the same interval. In the third row, during T1, the first directional beam (A1) of the beam sweep 1470 of the $A_1$ base station 1404 occurs simultaneously with the first directional beam (B1-1) of the beam sweep 1455 of the $B_1$ base station 1402. In contrast, in the fourth row, during T1, the second directional beam (A2) of the beam sweep 1470 of the $A_1$ base station 1404 occurs simultaneously with the first directional beam (B1-1) of the beam sweep 1455 of the $B_1$ base station 1402.

As previously noted, the particular permutation of simultaneous directional beams to avoid to prevent redirecting of a directional beam of the beam sweep 1470 towards the UE-A 1424 are A1 and P2. As shown in the table 1484, this permutation to avoid does not arise in the first scenario (third row), but does arise in the second scenario (fourth row) (twice, as indicated with an "X"). Thus, when the $B_1$ base station 1402 implements the joint beam sweep process 1300, the likelihood of a scenario occurring in which the permutation to avoid occurs is ½ or 50%. Extrapolating from this example for cases in which beam sweeps have more than two directional beams per segment, when the $B_1$ base station 1402 implements the joint beam sweep process 1300, the likelihood of a scenario occurring in which the permutation to avoid occurs is 1/# of directional beams in the beam sweep segment.

Figure 14C:
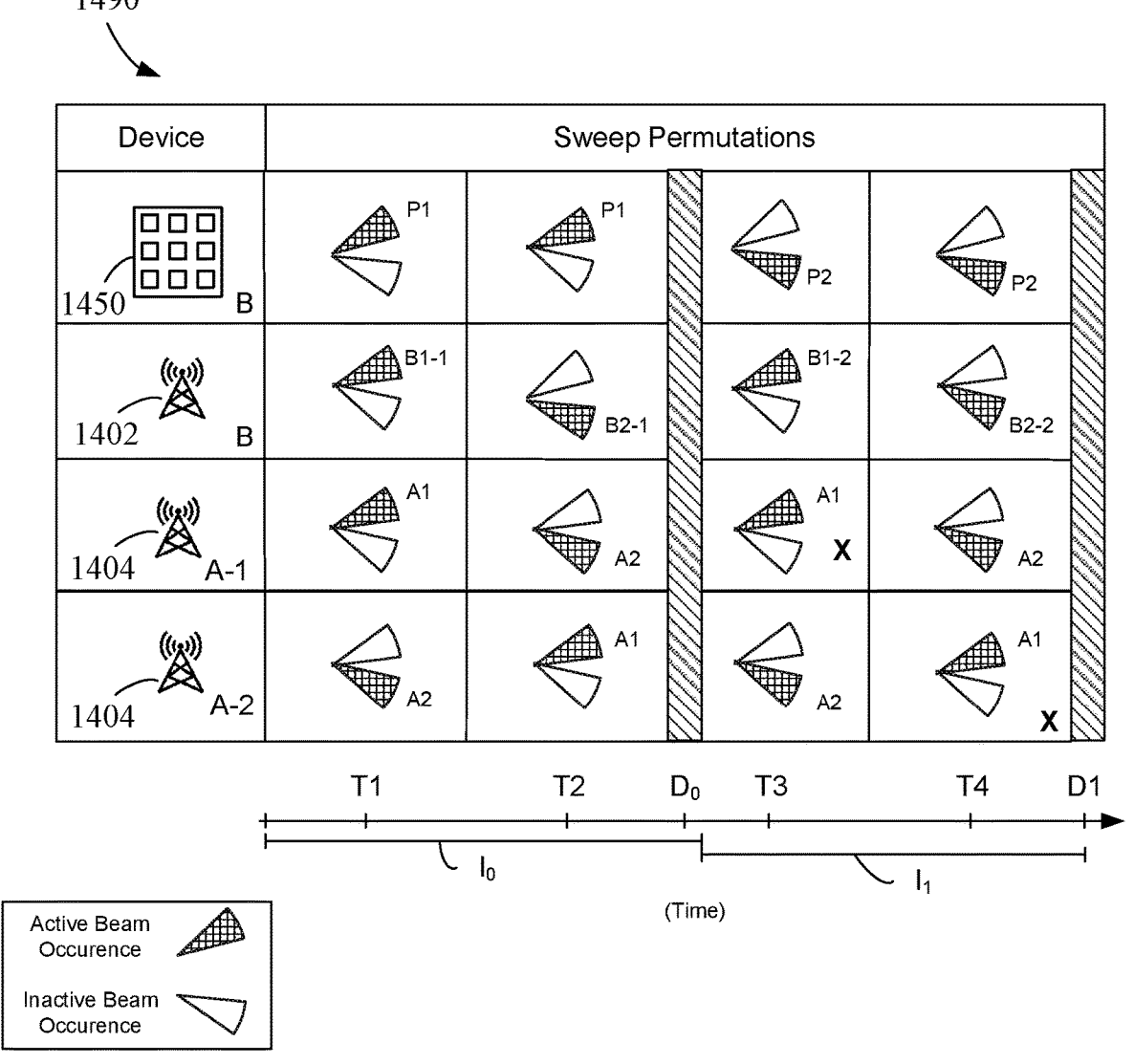

FIG. 14C illustrates a second table 1490 of sweep permutations over time for the communication system 1400. The sweep permutations of the second table 1490 are generated using a different joint beam sweep process 1300. Relative to the joint beam sweep process 1300 and illustrated in the first table 1484, the joint beam sweep process used to generate the second table 1490 has an increased likelihood of a scenario occurring in which the permutation to avoid occurs.

More particularly, the first two rows of the second table 1490 illustrate the directional beams for the four permutations of another joint beam sweep technique for the $B_1$ base station 1402 and the controllable reflective surface 1450. In particular, to create the order of the four permutations in the table 1490, the $B_1$ base station 1402 would transmit non-consecutive directional beams of the beam sweep 1455 toward the controllable reflective surface 1450, and holds the controllable reflective surface 1450 in a particular configuration over consecutive directional beam occurrences. In other words, the B1 base station 1402 does not send directional beams that are to be directed toward the controllable reflective surface 1450 consecutively while the controllable reflective surface 1450 cycles through different directional configurations. Thus, the order of the four permutations of the first two rows in the second table 1490 is different than the first two rows in the first table 1484. More particularly, the permutations of the first two rows in the second table 1490 are: a first permutation occurs during T1 (B1-1, P1 directional beams), a second permutation occurs during T2 (B2-1, P1 directional beams), a third permutation occurs during T3 (B1-2, P2 directional beams), and a fourth permutation occurs during T4 (B2-2, P2 directional beams).

The third and fourth rows of the table 1490 illustrate the same two beam sweep scenarios for the $A_1$ base station 1404 that were shown in the table 1484. In the third row, during T1, the first directional beam (A1) of the beam sweep 1470 of the $A_1$ base station 1404 occurs simultaneously with the first directional beam (B1-1) of the beam sweep 1455 of the $B_1$ base station 1402. In contrast, in the fourth row, during T1, the second directional beam (A2) of the beam sweep 1470 of the $A_1$ base station 1404 occurs simultaneously with the first directional beam (B1-1) of the beam sweep 1455 of the $B_1$ base station 1402.

As previously noted, the particular permutation of simultaneous directional beams to avoid to prevent redirecting of a directional beam of the beam sweep 1470 towards the UE-A 1424 is A1 and P2. As shown in the table 1490, this permutation to avoid arises in both the first scenario (third row) and the second scenario (fourth row), with each instance indicated with an "X." Thus, when the $B_1$ base station 1402 implements this alternate joint beam sweep process, the likelihood of a scenario occurring in which the permutation to avoid occurs is 1/1 or 100%. Further, the likelihood does not change with an increase in the number of directional beams in the beam sweep.

Accordingly, controlling the controllable reflective surface 1450 when implementing the joint beam sweep process 1300 of FIG. 13 reduces the likelihood of a redirection of a potential second beam sweep (e.g., the beam sweep 1470 from the $A_1$ base station 1404) towards the UE-A 1424.

The tables 1484 and 1490 illustrate scenarios in which the $B_1$ and $A_1$ base stations 1402 and 1404 perform beam sweeps synchronously. In scenarios in which the $B_1$ and $A_1$ base stations 1402 and 1404 perform beam sweeps asynchronously, the likelihood of a scenario occurring in which the permutation to avoid (P1, A1) occurs may be even lower. However, because the process 1300 and the FIGS. 14A-C presume that, at least in some examples, the $B_1$ base station 1402 is unaware of the sweep timing for the beam sweep 1470 of the $A_1$ base station 1404, the $B_1$ base station 1402 may be configured to implement the joint beam sweep process 1300 to reduce the likelihood of a scenario occurring in which the permutation to avoid occurs even when the $B_1$ and $A_1$ base stations 1402 and 1404 happen to perform beam sweeps synchronously.

Further Examples Having a Variety of Features

Example 1: A method, apparatus, and non-transitory computer-readable medium for performing, by a first scheduling entity that is co-located at a site with a second scheduling entity, a first beam sweep. The first beam sweep includes transmitting a plurality of directional beams. The method, apparatus, and non-transitory computer-readable medium further for transmitting a control signal, by the first scheduling entity, to a controllable reflective surface to control the controllable reflective surface to reduce a likelihood of a redirection, by the controllable reflective surface, of a directional beam of a potential second beam sweep by the second scheduling entity towards a scheduled entity associated with the second scheduling entity.

Example 2: A method, apparatus, and non-transitory computer-readable medium of Example 1, wherein the performing, by the first scheduling entity that is co-located at a site with a second scheduling entity, the first beam sweep comprises: performing the first beam sweep asynchronously with respect to the potential second beam sweep by the second scheduling entity; and wherein the transmitting a control signal, by the first scheduling entity, to the controllable reflective surface to control the controllable reflective surface to reduce the likelihood of the redirection comprises: maintaining the controllable reflective surface in a directional configuration during an expected time period for the potential second beam sweep by the second scheduling entity.

Example 3: A method, apparatus, and non-transitory computer-readable medium of Example 2, wherein the performing the first beam sweep asynchronously with respect to the potential second beam sweep by the second scheduling entity comprises: determining the expected time period for the potential second beam sweep of the second scheduling entity; and performing the first beam sweep during a time period other than the expected time period for the potential second beam sweep.

Example 4: A method, apparatus, and non-transitory computer-readable medium of Example 3, wherein determining the expected time period for the potential second beam sweep of the second scheduling entity comprises: receiving a communication that indicates the expected time period for the potential second beam sweep of the second scheduling entity.

Example 5: A method, apparatus, and non-transitory computer-readable medium of any of Examples 2 to 4, wherein the directional configuration is at least one selected from the group consisting of a disabled directional configuration and a stable directional configuration.

Example 6: A method, apparatus, and non-transitory computer-readable medium of any of Examples 2 to 5, further including receiving feedback from a scheduled entity associated with the first scheduling entity in response to the first beam sweep, wherein the directional configuration in which the controllable reflective surface is maintained is based on the feedback.

Example 7: A method, apparatus, and non-transitory computer-readable medium of Examples 1, wherein the control signal transmitted by the first scheduling entity is configured to: for a subset of the directional beams, which are transmitted in a direction of the controllable reflective surface, control the controllable reflective surface to sweep the directional beams of the subset by cycling through a plurality of directional configurations that each have a different beam reflection direction.

Example 8: A method, apparatus, and non-transitory computer-readable medium of any of Examples 1 to 7, wherein each directional beam of the plurality of directional beams includes a synchronization signal block (SSB) that includes a primary synchronization signal (PSS), a secondary synchronization signal (SSS), a master information block (MIB), and a demodulation reference signal (DM-RS).

Example 9: A method, apparatus, and non-transitory computer-readable medium of any of Examples 1 to 9, further including receiving, from a scheduled entity associated with the first scheduling entity, a random access request message identifying a directional beam of the plurality of directional beams.

This disclosure presents several aspects of a wireless communication network with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The present disclosure uses the word "exemplary" to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The present disclosure uses the term "coupled" to refer to a direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The present disclosure uses the terms "circuit" and "circuitry" broadly, to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14C may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14C may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Applicant provides this description to enable any person skilled in the art to practice the various aspects described herein. Those skilled in the art will readily recognize various modifications to these aspects, and may apply the generic principles defined herein to other aspects. Applicant does not intend the claims to be limited to the aspects shown herein, but to be accorded the full scope consistent with the language of the claims, wherein reference to an element in the singular is not intended to mean "one and only one" unless specifically so stated, but rather "one or more." Unless specifically stated otherwise, the present disclosure uses the term "some" to refer to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication, comprising:
performing, by a first scheduling entity that is co-located at a site with a second scheduling entity, a first beam sweep, wherein the first beam sweep includes transmitting a plurality of directional beams; and
transmitting a control signal, by the first scheduling entity, to a controllable reflective surface to control the controllable reflective surface to reduce a likelihood of a redirection, by the controllable reflective surface, of a directional beam of a potential second beam sweep by the second scheduling entity towards a scheduled entity associated with the second scheduling entity.

2. The method of claim 1,
wherein the performing, by the first scheduling entity that is co-located at a site with a second scheduling entity, the first beam sweep comprises:

performing the first beam sweep asynchronously with respect to the potential second beam sweep by the second scheduling entity; and wherein the transmitting a control signal, by the first scheduling entity, to the controllable reflective surface to control the controllable reflective surface to reduce the likelihood of the redirection comprises:

maintaining the controllable reflective surface in a directional configuration during an expected time period for the potential second beam sweep by the second scheduling entity.

3. The method of claim 2, wherein the performing the first beam sweep asynchronously with respect to the potential second beam sweep by the second scheduling entity comprises:

determining the expected time period for the potential second beam sweep of the second scheduling entity; and performing the first beam sweep during a time period other than the expected time period for the potential second beam sweep.

4. The method of claim 3, wherein determining the expected time period for the potential second beam sweep of the second scheduling entity comprises:

receiving a communication that indicates the expected time period for the potential second beam sweep of the second scheduling entity.

5. The method of claim 2, wherein the directional configuration is at least one selected from the group consisting of a disabled directional configuration and a stable directional configuration.

6. The method of claim 2, further comprising:

receiving feedback from a scheduled entity associated with the first scheduling entity in response to the first beam sweep, wherein the directional configuration in which the controllable reflective surface is maintained is based on the feedback.

7. The method of claim 1, wherein the control signal transmitted by the first scheduling entity is configured to:

for a subset of the directional beams, which are transmitted in a direction of the controllable reflective surface, control the controllable reflective surface to sweep the directional beams of the subset by cycling through a plurality of directional configurations that each have a different beam reflection direction.

8. The method of claim 1, wherein each directional beam of the plurality of directional beams includes a synchronization signal block (SSB) that includes a primary synchronization signal (PSS), a secondary synchronization signal (SSS), a master information block (MIB), and a demodulation reference signal (DM-RS).

9. The method of claim 1, further comprising:

receiving, from a scheduled entity associated with the first scheduling entity, a random access request message identifying a directional beam of the plurality of directional beams.

10. An apparatus for wireless communication, comprising:

means for performing, by a first scheduling entity that is co-located at a site with a second scheduling entity, a first beam sweep, wherein the first beam sweep includes transmitting a plurality of directional beams; and means for transmitting a control signal, by the first scheduling entity, to a controllable reflective surface to control the controllable reflective surface to reduce a likelihood of a redirection, by the controllable reflective surface, of a directional beam of a potential second beam sweep by the second scheduling entity towards a scheduled entity associated with the second scheduling entity.

11. The apparatus of claim 10, wherein the means for performing, by the first scheduling entity that is co-located at a site with a second scheduling entity, the first beam sweep comprises:

means for performing the first beam sweep asynchronously with respect to the potential second beam sweep by the second scheduling entity; and wherein the means for transmitting the control signal, by the first scheduling entity, to the controllable reflective surface to control the controllable reflective surface to reduce the likelihood of the redirection comprises:

means for maintaining the controllable reflective surface in a directional configuration during an expected time period for the potential second beam sweep by the second scheduling entity.

12. The apparatus of claim 11, wherein the means for performing the first beam sweep asynchronously with respect to the potential second beam sweep by the second scheduling entity comprises:

means for determining the expected time period for the potential second beam sweep of the second scheduling entity; and means for performing the first beam sweep during a time period other than the expected time period for the potential second beam sweep.

13. The apparatus of claim 12, wherein means for determining the expected time period for the potential second beam sweep of the second scheduling entity comprises:

means for receiving a communication that indicates the expected time period for the potential second beam sweep of the second scheduling entity.

14. The apparatus of claim 11, wherein the directional configuration is at least one selected from the group consisting of a disabled directional configuration and a stable directional configuration.

15. The apparatus of claim 11, further comprising:

means for receiving feedback from a scheduled entity associated with the first scheduling entity in response to the first beam sweep, wherein the directional configuration in which the controllable reflective surface is maintained is based on the feedback.

16. The apparatus of claim 10, wherein the control signal transmitted by the first scheduling entity is configured to:

for a subset of the directional beams, which are transmitted in a direction of the controllable reflective surface, control the controllable reflective surface to sweep the directional beams of the subset by cycling through a plurality of directional configurations that each have a different beam reflection direction.

17. A non-transitory computer-readable medium storing computer-executable code, comprising code for causing a computer to:

perform, by a first scheduling entity that is co-located at a site with a second scheduling entity, a first beam sweep, wherein the first beam sweep includes transmitting a plurality of directional beams; and transmit a control signal, by the first scheduling entity, to a controllable reflective surface to control the controllable reflective surface to reduce a likelihood of a redirection, by the controllable reflective surface, of a directional beam of a potential second beam sweep by the second scheduling entity towards a scheduled entity associated with the second scheduling entity.

18. The non-transitory computer-readable medium storing computer-executable code of claim 17, wherein the code for causing a computer to perform, by the first scheduling entity that is co-located at a site with a second scheduling entity, the first beam sweep comprises:

code for causing the computer to perform the first beam sweep asynchronously with respect to the potential second beam sweep by the second scheduling entity; and wherein the code for causing a computer to transmit the control signal, by the first scheduling entity, to the controllable reflective surface to control the controllable reflective surface to reduce the likelihood of the redirection comprises:

code for causing the computer to maintain the controllable reflective surface in a directional configuration during an expected time period for the potential second beam sweep by the second scheduling entity.

19. The non-transitory computer-readable medium storing computer-executable code of claim 18, wherein the code for causing a computer to perform the first beam sweep asynchronously with respect to the potential second beam sweep by the second scheduling entity comprises:

code for causing the computer to determine the expected time period for the potential second beam sweep of the second scheduling entity; and code for causing the computer to perform the first beam sweep during a time period other than the expected time period for the potential second beam sweep.

20. The non-transitory computer-readable medium storing computer-executable code of claim 19, wherein code for causing the computer to determine the expected time period for the potential second beam sweep of the second scheduling entity comprises:

code for causing the computer to receive a communication that indicates the expected time period for the potential second beam sweep of the second scheduling entity.

21. The non-transitory computer-readable medium storing computer-executable code of claim 18, wherein the directional configuration is at least one selected from the group consisting of a disabled directional configuration and a stable directional configuration.

22. The non-transitory computer-readable medium storing computer-executable code of claim 18, further comprising:

code for causing the computer to receive feedback from a scheduled entity associated with the first scheduling entity in response to the first beam sweep, wherein the directional configuration in which the controllable reflective surface is maintained is based on the feedback.

23. The non-transitory computer-readable medium storing computer-executable code of claim 17, wherein the control signal transmitted by the first scheduling entity is configured to:

for a subset of the directional beams, which are transmitted in a direction of the controllable reflective surface, control the controllable reflective surface to sweep the directional beams of the subset by cycling through a plurality of directional configurations that each have a different beam reflection direction.

24. An apparatus for wireless communication, comprising:

a processor of a first scheduling entity that is co-located at a site with a second scheduling entity;

a transceiver communicatively coupled to the processor; and a memory communicatively coupled to the processor, wherein the processor and the memory are configured to:

perform a first beam sweep, wherein the first beam sweep includes transmitting a plurality of directional beams; and transmit a control signal to a controllable reflective surface to control the controllable reflective surface to reduce a likelihood of a redirection, by the controllable reflective surface, of a directional beam of a potential second beam sweep by the second scheduling entity towards a scheduled entity associated with the second scheduling entity.

25. The apparatus of claim 24, wherein the processor is configured to perform the first beam sweep asynchronously with respect to the potential second beam sweep by the second scheduling entity; and wherein the control signal is configured to maintain the controllable reflective surface in a directional configuration during an expected time period for the potential second beam sweep by the second scheduling entity.

26. The apparatus of claim 25, wherein to perform the first beam sweep asynchronously with respect to the potential second beam sweep by the second scheduling entity, the processor is configured to:

determine the expected time period for the potential second beam sweep of the second scheduling entity; and perform the first beam sweep during a time period other than the expected time period for the potential second beam sweep.

27. The apparatus of claim 26, wherein, to determine the expected time period for the potential second beam sweep of the second scheduling entity, the processor is configured to:

receive a communication that indicates the expected time period for the potential second beam sweep of the second scheduling entity.

28. The apparatus of claim 25, wherein the directional configuration is at least one selected from the group consisting of a disabled directional configuration and a stable directional configuration.

29. The apparatus of claim 25, wherein the processor is further configured to:

receive feedback from a scheduled entity associated with the first scheduling entity in response to the first beam sweep, wherein the directional configuration in which the controllable reflective surface is maintained is based on the feedback.

30. The apparatus of claim 24, wherein the control signal is configured to:

for a subset of the directional beams, which are transmitted in a direction of the controllable reflective surface, control the controllable reflective surface to sweep the directional beams of the subset by cycling through a plurality of directional configurations that each have a different beam reflection direction.

* * * * *